US011902327B2

(12) United States Patent
Wood et al.

(10) Patent No.: US 11,902,327 B2
(45) Date of Patent: Feb. 13, 2024

(54) EVALUATING A RESULT OF ENFORCEMENT OF ACCESS CONTROL POLICIES INSTEAD OF ENFORCING THE ACCESS CONTROL POLICIES

(71) Applicant: Microsoft Technology Licensing, LLC, Redmond, WA (US)

(72) Inventors: Daniel Edward Lee Wood, Seattle, WA (US); Caleb Geoffrey Baker, Seattle, WA (US); Sarat Subramaniam, Bellevue, WA (US); Etan Micah Basseri, Seattle, WA (US); Carlos Adrian Lopez Castro, Duvall, WA (US); Sandra Jiang, Seattle, WA (US); Dilesh Dhokia, Kirkland, WA (US); Jessica Tian-Hueih Lin, Seattle, WA (US); Pui Yin Winfred Wong, Redmond, WA (US); Robyn Nicole Hicock, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 49 days.

(21) Appl. No.: 16/735,670

(22) Filed: Jan. 6, 2020

(65) Prior Publication Data
US 2021/0211470 A1 Jul. 8, 2021

(51) Int. Cl.
*H04L 9/40* (2022.01)
*G06F 21/57* (2013.01)
(Continued)

(52) U.S. Cl.
CPC .............. *H04L 63/20* (2013.01); *G06F 21/57* (2013.01); *G06F 21/604* (2013.01);
(Continued)

(58) Field of Classification Search
None
See application file for complete search history.

(56) References Cited

U.S. PATENT DOCUMENTS 7,200,865 B1 * 4/2007 Roscoe ................... H04L 63/20
726/13
8,448,220 B2 * 5/2013 Roy ....................... G06F 21/604
726/1
(Continued)

OTHER PUBLICATIONS

Morovat "Designing Secure Access Control Model in Cyber Social Networks," University of Arkansas, Fayetteville, ScholarWorks, Theses and Dissertations, Aug. 2017, pp. 1-177 (Year: 2017).*
(Continued)

*Primary Examiner* — Luu T Pham
*Assistant Examiner* — James J Wilcox
(74) *Attorney, Agent, or Firm* — Wade IP Law PLLC

(57) ABSTRACT

Techniques are described herein that are capable of evaluating a result of enforcement of access control policies instead of enforcing the access control policies. For instance, a result of enforcement of an access control policy with regard to sign-in processes is evaluated instead of enforcing the access control policy with regard to the sign-in processes. The evaluation includes monitoring access requests that are received during the sign-in processes. Each access request requests access to a resource. The evaluation further includes comparing attributes of each access request against the access control policy that specifies criteria that are to be satisfied as a prerequisite to granting access to the resource to which access is requested by the respective access request. Metadata associated with the sign-in processes is generated instead of enforcing the access control policy with regard to the sign-in processes.

20 Claims, 14 Drawing Sheets

(51) Int. Cl.
*G06F 21/60* (2013.01)
*G06F 21/62* (2013.01)
*G06F 9/54* (2006.01)

(52) U.S. Cl.
CPC .......... *G06F 21/6218* (2013.01); *H04L 63/08* (2013.01); *H04L 63/10* (2013.01); *H04L 63/102* (2013.01); *H04L 63/1408* (2013.01); *G06F 9/54* (2013.01)

(56) References Cited

U.S. PATENT DOCUMENTS

| | | | | |
|---|---|---|---|---|
| 8,566,906 | B2* | 10/2013 | Gross | G06F 21/6218 726/2 |
| 8,731,983 | B2* | 5/2014 | Gudla | G06Q 10/063 705/7.11 |
| 8,805,971 | B1* | 8/2014 | Roth | G06F 9/5072 709/220 |
| 8,856,077 | B1* | 10/2014 | Roth | G06F 9/5072 707/638 |
| 8,973,108 | B1* | 3/2015 | Roth | G06F 21/00 726/28 |
| 9,075,788 | B1* | 7/2015 | Roth | G06F 11/3086 |
| 9,111,088 | B2* | 8/2015 | Ghai | G06F 21/55 |
| 9,210,178 | B1* | 12/2015 | Roth | H04L 63/105 |
| 9,313,230 | B1* | 4/2016 | Kruse | H04L 63/20 |
| 9,323,938 | B2* | 4/2016 | Glazier | G06F 8/10 |
| 9,473,522 | B1* | 10/2016 | Kotler | H04L 63/1433 |
| 9,507,346 | B1* | 11/2016 | Levinson | G05D 1/0044 |
| 9,606,539 | B1* | 3/2017 | Kentley | G08G 1/202 |
| 9,612,123 | B1* | 4/2017 | Levinson | G05D 1/0297 |
| 9,632,502 | B1* | 4/2017 | Levinson | B60Q 1/507 |
| 9,948,681 | B1* | 4/2018 | Kruse | H04L 63/20 |
| 10,101,801 | B2* | 10/2018 | Silberstein | H04N 21/8455 |
| 10,122,757 | B1* | 11/2018 | Kruse | H04L 63/10 |
| 10,129,365 | B2* | 11/2018 | Silberstein | G06F 16/9574 |
| 10,139,789 | B2* | 11/2018 | Soni | H04L 12/282 |
| 10,404,707 | B2* | 9/2019 | Martinelli | G06F 21/604 |
| 10,409,642 | B1* | 9/2019 | Tang | G06F 9/5005 |
| 10,453,572 | B1* | 10/2019 | Brooks | G16H 40/40 |
| 10,469,327 | B1* | 11/2019 | Velmurugan | H04L 67/10 |
| 10,469,330 | B1* | 11/2019 | Roth | H04L 41/22 |
| 10,592,068 | B1* | 3/2020 | Sedky | G06F 9/50 |
| 10,747,390 | B1* | 8/2020 | Ranabahu | G06F 21/62 |
| 10,824,913 | B1* | 11/2020 | Genc | G06V 10/82 |
| 10,896,421 | B2* | 1/2021 | Adjaoute | G06Q 20/384 |
| 10,915,523 | B1* | 2/2021 | Paiz | H04L 67/52 |
| 10,922,363 | B1* | 2/2021 | Paiz | H04L 67/02 |
| 10,922,423 | B1* | 2/2021 | Rungta | G06F 21/604 |
| 10,936,687 | B1* | 3/2021 | Paiz | G06F 16/3341 |
| 10,986,131 | B1* | 4/2021 | Kruse | H04L 63/10 |
| 11,210,823 | B1* | 12/2021 | Simeonov | G06Q 30/0201 |
| 11,436,656 | B2* | 9/2022 | Huang | G06Q 30/0643 |
| 11,765,046 | B1* | 9/2023 | Zeng | H04L 41/16 709/223 |
| 2002/0169658 | A1* | 11/2002 | Adler | G06Q 10/06 705/7.29 |
| 2003/0028498 | A1* | 2/2003 | Hayes-Roth | G06N 20/00 706/17 |
| 2003/0043815 | A1* | 3/2003 | Tinsley | G06F 9/451 370/395.21 |
| 2004/0002932 | A1* | 1/2004 | Horvitz | G06Q 10/107 706/46 |
| 2004/0193703 | A1* | 9/2004 | Loewy | H04L 41/0893 709/220 |
| 2004/0205342 | A1* | 10/2004 | Roegner | H04L 63/10 713/168 |
| 2004/0268145 | A1* | 12/2004 | Watkins | H04L 63/1433 714/E11.207 |
| 2005/0182852 | A1* | 8/2005 | Tinsley | H04L 47/2416 709/238 |
| 2005/0183143 | A1* | 8/2005 | Anderholm | G06F 11/3438 726/22 |
| 2007/0118643 | A1* | 5/2007 | Mishra | H04L 41/149 709/224 |
| 2007/0244777 | A1* | 10/2007 | Torre | G06Q 40/00 705/35 |
| 2009/0254971 | A1* | 10/2009 | Herz | G06Q 10/10 726/1 |
| 2009/0276204 | A1* | 11/2009 | Kumar | H04L 63/0227 726/13 |
| 2011/0078169 | A1* | 3/2011 | Sit | G06Q 10/10 707/769 |
| 2012/0060142 | A1* | 3/2012 | Fliess | G06F 11/3457 717/102 |
| 2012/0116868 | A1* | 5/2012 | Chin | G06Q 30/0244 705/14.43 |
| 2012/0258777 | A1* | 10/2012 | Huang | H04W 4/60 709/204 |
| 2012/0278091 | A1* | 11/2012 | Yaseen | G06Q 30/02 705/1.1 |
| 2013/0123958 | A1* | 5/2013 | Fernandez | G07F 17/3225 700/91 |
| 2013/0166767 | A1* | 6/2013 | Olivier | H04N 21/2143 709/231 |
| 2013/0333010 | A1* | 12/2013 | Chougle | G06F 21/31 726/7 |
| 2014/0074689 | A1* | 3/2014 | Lund | G06Q 40/03 705/38 |
| 2014/0189777 | A1* | 7/2014 | Viswanathan | H04L 63/105 726/1 |
| 2014/0201126 | A1* | 7/2014 | Zadeh | A61B 5/165 706/52 |
| 2015/0046973 | A1* | 2/2015 | Gross | G06F 21/6218 726/1 |
| 2015/0050623 | A1* | 2/2015 | Falash | G09B 9/24 434/362 |
| 2015/0094996 | A1* | 4/2015 | Barberis | G06F 30/20 703/2 |
| 2015/0134443 | A1* | 5/2015 | Hallak | G06Q 30/0242 705/14.41 |
| 2015/0200943 | A1* | 7/2015 | Pitre | G06F 21/45 726/1 |
| 2015/0310228 | A1* | 10/2015 | Benz | G16B 50/40 726/26 |
| 2016/0055222 | A1* | 2/2016 | Sarferaz | G06F 16/28 707/603 |
| 2016/0072814 | A1* | 3/2016 | Martinelli | H04L 63/101 726/1 |
| 2016/0105471 | A1* | 4/2016 | Nunes | H04L 12/4641 709/228 |
| 2016/0140052 | A1* | 5/2016 | Waldspurger | G06F 12/121 711/136 |
| 2016/0180248 | A1* | 6/2016 | Regan | G09B 5/00 706/12 |
| 2016/0247092 | A1* | 8/2016 | Watanabe | G06Q 10/101 |
| 2016/0259946 | A1* | 9/2016 | Mardikar | G06F 8/60 |
| 2016/0283970 | A1* | 9/2016 | Ghavamzadeh | G06Q 30/0269 |
| 2016/0306979 | A1* | 10/2016 | Kotler | G06F 21/554 |
| 2016/0306980 | A1* | 10/2016 | Kotler | G06F 21/577 |
| 2016/0359915 | A1* | 12/2016 | Gupta | H04L 43/04 |
| 2016/0366141 | A1* | 12/2016 | Smith | H04L 63/08 |
| 2017/0109475 | A1* | 4/2017 | Kaditz | G16H 50/80 |
| 2017/0123421 | A1* | 5/2017 | Kentley | G05D 1/0088 |
| 2017/0123422 | A1* | 5/2017 | Kentley | B60Q 3/00 |
| 2017/0123428 | A1* | 5/2017 | Levinson | G05D 1/0231 |
| 2017/0123429 | A1* | 5/2017 | Levinson | G01S 17/87 |
| 2017/0124476 | A1* | 5/2017 | Levinson | G06V 20/58 |
| 2017/0124781 | A1* | 5/2017 | Douillard | G08G 1/207 |
| 2017/0126810 | A1* | 5/2017 | Kentley | G06Q 10/087 |
| 2017/0132334 | A1* | 5/2017 | Levinson | G05D 1/0088 |
| 2017/0132934 | A1* | 5/2017 | Kentley | G08G 1/202 |
| 2017/0163684 | A1* | 6/2017 | Brucker | H04L 63/20 |
| 2017/0169143 | A1* | 6/2017 | Farahat | G06F 17/18 |
| 2017/0195854 | A1* | 7/2017 | Shi-Nash | H04W 4/021 |
| 2017/0243195 | A1* | 8/2017 | Xing | G06Q 20/0855 |
| 2017/0250915 | A1* | 8/2017 | Long, III | H04L 41/0894 |
| 2017/0257279 | A1* | 9/2017 | Mishra | H04L 41/0856 |
| 2017/0309094 | A1* | 10/2017 | Farahat | G07C 5/0841 |
| 2017/0316333 | A1* | 11/2017 | Levinson | G01S 17/87 |

(56) References Cited

U.S. PATENT DOCUMENTS

| | | | |
|---|---|---|---|
| 2018/0069899 A1* | 3/2018 | Lang | G06F 3/0482 |
| 2018/0121560 A1* | 5/2018 | Chen | G06F 16/954 |
| 2018/0123904 A1* | 5/2018 | Thakrar | H04L 47/78 |
| 2018/0136651 A1* | 5/2018 | Levinson | B60W 30/00 |
| 2018/0204111 A1* | 7/2018 | Zadeh | G06V 10/764 |
| 2018/0240547 A1* | 8/2018 | Albert | G06Q 10/0631 |
| 2018/0241751 A1* | 8/2018 | Kruse | H04L 63/08 |
| 2018/0322163 A1* | 11/2018 | Puvvada | G06F 11/3051 |
| 2018/0332053 A1* | 11/2018 | Weis | H04L 63/20 |
| 2018/0332421 A1* | 11/2018 | Torres | H04S 3/008 |
| 2018/0349134 A1* | 12/2018 | Studer | G06F 8/34 |
| 2019/0089742 A1* | 3/2019 | Hill | H04L 63/1433 |
| 2019/0095320 A1* | 3/2019 | Biswas | G06F 11/3457 |
| 2019/0102676 A1* | 4/2019 | Nazari | G06N 3/08 |
| 2019/0102880 A1* | 4/2019 | Parpara | A61C 7/002 |
| 2019/0114655 A1* | 4/2019 | Saarenvirta | G06Q 30/0207 |
| 2019/0205511 A1* | 7/2019 | Zhan | G06F 21/45 |
| 2019/0205773 A1* | 7/2019 | Ackerman | G06Q 10/067 |
| 2019/0207818 A1* | 7/2019 | Niestemski | H04L 41/0233 |
| 2019/0213498 A1* | 7/2019 | Adjaoute | G06Q 20/405 |
| 2019/0227553 A1* | 7/2019 | Kentley-Klay | B60L 58/12 |
| 2019/0258953 A1* | 8/2019 | Lang | G06N 3/08 |
| 2019/0312910 A1* | 10/2019 | Convertino | H04L 41/145 |
| 2019/0387060 A1* | 12/2019 | Kentley-Klay | G05D 1/024 |
| 2019/0392485 A1* | 12/2019 | Calauzènes | G06Q 30/0277 |
| 2020/0061811 A1* | 2/2020 | Iqbal | G06N 3/08 |
| 2020/0099677 A1* | 3/2020 | Grajek | H04W 12/069 |
| 2020/0100871 A1* | 4/2020 | Wang | G06F 30/23 |
| 2020/0184278 A1* | 6/2020 | Zadeh | G06N 3/044 |
| 2020/0210127 A1* | 7/2020 | Browy | H04B 7/155 |
| 2020/0211305 A1* | 7/2020 | Bender | G06N 5/02 |
| 2020/0211680 A1* | 7/2020 | Sablinski | G16H 20/00 |
| 2020/0311729 A1* | 10/2020 | Matthews | G06Q 20/401 |
| 2020/0312179 A1* | 10/2020 | Desai | G09B 7/08 |
| 2020/0337648 A1* | 10/2020 | Saripalli | G16H 15/00 |
| 2020/0382363 A1* | 12/2020 | Woolward | H04L 41/08 |
| 2020/0382556 A1* | 12/2020 | Woolward | G06F 16/9024 |
| 2020/0382557 A1* | 12/2020 | Woolward | H04L 63/1441 |
| 2020/0382560 A1* | 12/2020 | Woolward | H04L 63/205 |
| 2020/0387584 A1* | 12/2020 | Gaber | G06F 11/3419 |
| 2021/0075794 A1* | 3/2021 | Gazit | H04L 63/1408 |
| 2021/0081543 A1* | 3/2021 | Ferreira | G06F 21/602 |
| 2021/0117850 A1* | 4/2021 | Amadieu | G06N 20/00 |
| 2021/0117896 A1* | 4/2021 | Koc | G06Q 10/06393 |
| 2021/0117910 A1* | 4/2021 | Koc | G06Q 10/06393 |
| 2021/0125052 A1* | 4/2021 | Tremblay | B25J 9/163 |
| 2021/0158690 A1* | 5/2021 | Lau | G08G 1/0112 |
| 2021/0357958 A1* | 11/2021 | Shao | G06F 16/215 |

OTHER PUBLICATIONS

Gemmill "A Trust-Relationship Management Framework for Federated Virtual Organizations," Dissertation, The University of Alabama at Birmingham, 2006, pp. 1-154 (Year: 2006).*

Damiani et al "New Paradigms for Access Control in Open Environments," 2005 IEEE International Symposium on Signal Processing and Information Technology, pp. 540-548 (Year: 2005).*

Bulter et al "Measurement and Prediction of Access Control Policy Evaluation Performance," IEEE Transactions on Network and Service Management, vol. 12, No. 4, Dec. 2015, pp. 326-539.*

Betge-Brezetz et al "Privacy Control in the Cloud based on Multilevel Policy Enforcement," 2012 IEEE 1st International Conference on Cloud Networking (CLOUDNET), pp. 167-169, (Year: 2012).*

Goyal et al "A System for Privacy Policy Enforcement & Access Control for Web Applications," IET-UK International Conference on Information and Communication Technology in Electrical Sciences (ICTES), pp. 1037-1042 (Year: 2007).*

* cited by examiner

FIG. 3

EVALUATING A RESULT OF ENFORCEMENT OF ACCESS CONTROL POLICIES INSTEAD OF ENFORCING THE ACCESS CONTROL POLICIES

BACKGROUND

Enterprises typically rely on automated access controls during sign-in of users to control which users have access to which resources under which circumstances. Configuring the access controls through software policy is relatively difficult for information technology (IT) administrators because the resulting access control policies often are intended to provide coverage in all circumstances, prevent adversarial attacks, and allow access to legitimate users with appropriate privileges. Moreover, access control policies traditionally are instantly enforced upon creation. Enforcement of the access control policies may result in some users being unintentionally blocked from accessing resources that they are authorized to access under the given circumstances. Furthermore, the result of enforcing the access control policies traditionally is analyzed holistically (i.e., a cumulative result of enforcing all access control policies is analyzed).

A variety of techniques have been proposed to provide insight with regard to an expected result of enforcing access control policies. However, each such technique has its limitations. In a first conventional technique, access control policies are implemented using a staged roll-out across an organization, starting with a small population and slowly expanding the roll-out once the impact to the existing population has been measured. However, in this technique, users can still be disrupted by the roll-out of the policies, and the policies may impact different groups within an organization differently. In a second conventional technique, the impact of access control policies is estimated by evaluating hypothetical sign-ins. However, in this technique, it is relatively difficult to enumerate all hypothetical scenarios that might actually occur when the policies are enforced.

SUMMARY

Various approaches are described herein for, among other things, evaluating a result of enforcement of access control policies instead of enforcing the access control policies. For example, during sign-in processes in which users sign-in to an enterprise and attempt to access resources, access policies that specify criteria for granting access to the resources may be evaluated instead of enforced. In accordance with this example, metadata may be generated to indicate whether the criteria are met. For instance, the metadata may indicate for each request to access a resource (i.e., for each access request) that (a) the access would have been granted, (b) the access would not have been granted, or (c) the user would have been prompted to perform an action to enable the access to be granted.

In a first example approach, a result of enforcement of access control policies with regard to sign-in processes is evaluated instead of enforcing the access control policies with regard to the sign-in processes. Evaluating the result includes monitoring access requests that are received during the sign-in processes. Each access request requests access to a resource. Evaluating the result further includes comparing attributes of each access request against at least a subset of the access control policies that specifies criteria that are to be satisfied as a prerequisite to granting access to the resource to which access is requested by the respective access request. Evaluating the result further includes generating metadata associated with the sign-in processes instead of enforcing the access control policies with regard to the sign-in processes. The metadata indicate whether the attributes of each access request in at least a subset of the access requests satisfy the criteria that are to be satisfied as a prerequisite to granting access to the resource to which access is requested by the respective access request.

In a second example approach, operations are performed to enforce a first access control policy with regard to sign-in processes and to evaluate a result of enforcement of a second access control policy with regard to the sign-in processes instead of enforcing the second access control policy with regard to the sign-in processes. The operations include monitoring access requests that are received during the sign-in processes. Each access request requests access to a resource. The operations further include comparing attributes of each access request against the first access control policy that specifies first criteria that are to be satisfied as a prerequisite to granting access to the resource to which access is requested by the respective access request. The operations further include comparing the attributes of each access request against the second access control policy that specifies second criteria that are to be satisfied as a prerequisite to granting access to the resource to which access is requested by the respective access request. The operations further include enforcing the first access control policy with regard to the sign-in processes. The operations further include generating metadata associated with the sign-in processes instead of enforcing the second access control policy with regard to the sign-in processes. The metadata indicate whether the attributes of each access request in at least a subset of the access requests satisfy the second criteria.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIG. 3 is a screenshot of an example user interface that provides a representation of a result of enforcement of access control policies in accordance with an embodiment.

Figure 1:
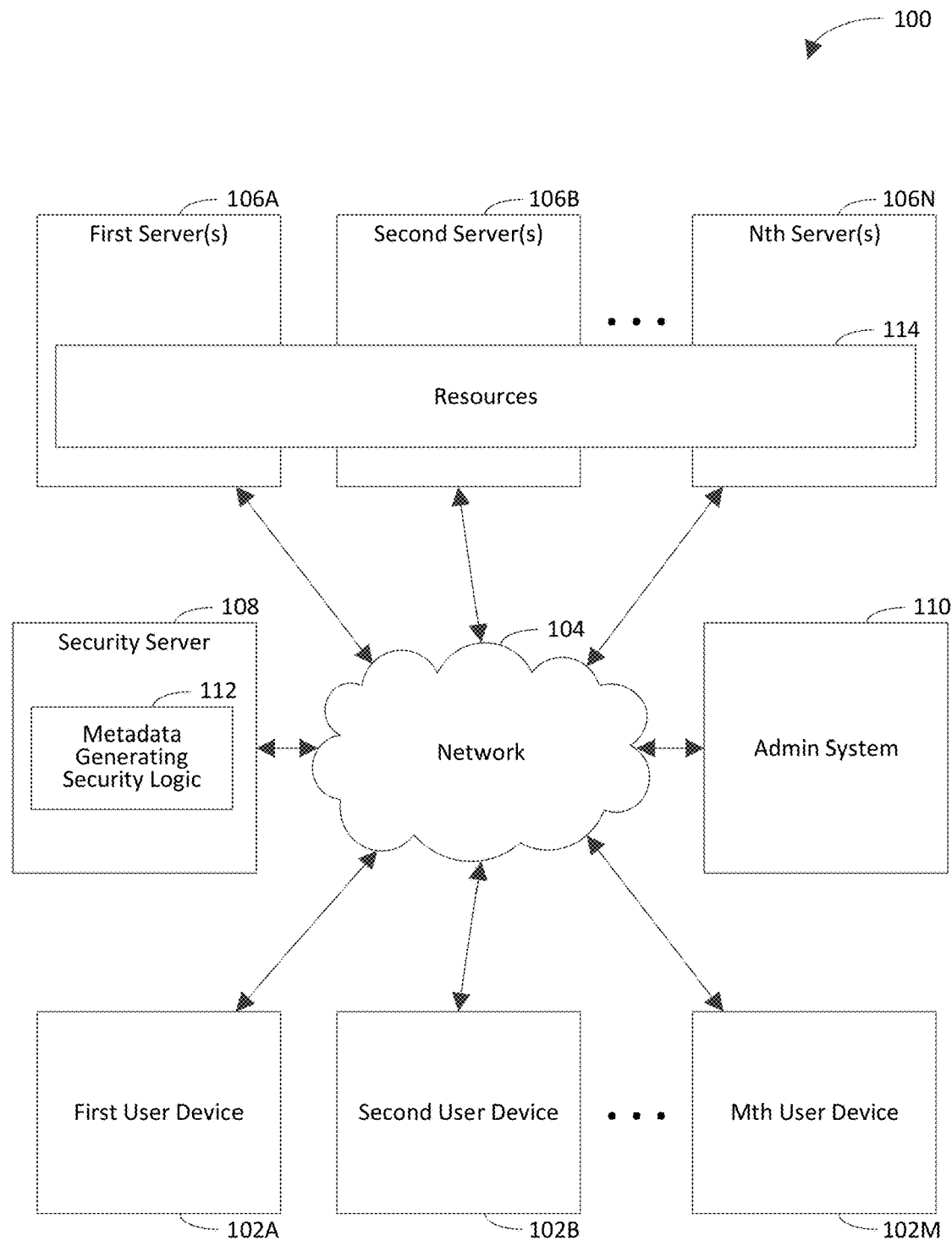
FIG. 1 is a block diagram of an example metadata generating security system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

II. Example Embodiments

Example embodiments described herein are capable of evaluating a result of enforcement of access control policies instead of enforcing the access control policies. For example, during sign-in processes in which users sign-in to an enterprise and attempt to access resources, access policies that specify criteria for granting access to the resources may be evaluated instead of enforced. In accordance with this example, metadata may be generated to indicate whether the criteria are met. For instance, the metadata may indicate for each request to access a resource (i.e., for each access request) that (a) the access would have been granted, (b) the access would not have been granted, or (c) the user would have been prompted to perform an action to enable the access to be granted.

Example techniques described herein have a variety of benefits as compared to conventional techniques for providing insight with regard to an expected result of enforcing access control policies. For instance, the example techniques may be capable of enabling IT administrators to monitor the actual impact of an access control policy without enforcing the access control policy against end users. Accordingly, the impact may be evaluated without impacting the end users. The example techniques may enable one or more first access control policies to be enforced, while one or more second access control polies are evaluated without being enforced. The result of enforcement of the one or more first access control policies and the result of enforcement of the one or more second access control policies may be documented (e.g., presented for viewing by an IT administrator) separately or in an aggregated manner. End users may be disrupted less frequently when the example techniques are employed, as compared to conventional techniques, which may increase efficiency of the end users. The example techniques may enable the impacts of multiple access control policies that interact with each other to be individually isolated for evaluation. The example techniques may enable the impacts of multiple access control policies that do not interact with each other to be aggregated for evaluation.

By evaluating a result of enforcement of access control policies instead of enforcing the access control policies, an IT administrator may determine how the access control policies may be modified to reduce a number of end users who would be inadvertently denied access to requested resources (e.g., without actually denying those users access to the requested resources). The example techniques may enable an IT administrator to review information (e.g., metadata) describing the result of the enforcement of the access control policies with regard to a time period selected by the IT administrator from a plurality of time periods (e.g., last hour, 4 hours, 12, hours, 24 hours, 48 hours, 3 days, 7 days, 14 days, 28 days, 30 days, 60 days, or 90 days), one or more end users selected by the IT administrator from all end users in the enterprise, one or more requested resources selected by the IT administrator from all requested resources, etc. The result of the enforcement of the access control policies may indicate a number of end users who would have been denied access to a requested resource, a number of end users who would have been granted access, a number of end users who would have been prompted to perform an action to enable access to be granted, locations of such end users, device platforms used by the end users, states of devices used by the end users, etc. The example techniques may increase security of a user (including a device and accounts of the user) by protecting against password spray attacks, which attempt to guess the password of the user from a list of commonly used passwords. For instance, the example techniques may protect against password spray attacks by providing information regarding a result of enforcing multi-factor authentication for requests to access resources. Having this information may instill confidence in an IT administrator to enforce multi-factor authentication.

The example techniques may reduce an amount of time and/or resources (e.g., processor, memory, network bandwidth) that are consumed to implement new access control policies and/or update existing access control policies. For instance, the evaluation of the access control policies may provide guidance as to which end users would have been inadvertently denied access to requested resource(s) if the access control policies had been enforced and may provide insight into modifications that may be made to the access control policies so that enforcement would no longer result in the inadvertent denial of access. By evaluating access control policies instead of enforcing the access control policies, loss of productivity that would have been experienced by end users who were inadvertently denied access to resource(s) and a cost associated therewith may avoided. The amount of time and/or resources that would have been consumed by an IT administrator or a computing system thereof to troubleshoot and correct inadvertent access denials resulting from enforcement of the control access policies may be avoided by performing the example techniques described herein. The example techniques may increase efficiency of a computing system that is used to implement access control policies. The example techniques may increase user efficiency (e.g., by reducing a number of steps that a user, such as an IT administrator, takes to implement the access control policies). The example techniques may lead to increased confidence of an IT administrator to implement access control policies, which may result in a timelier implementation of the access control policies.

FIG. 1 is a block diagram of an example metadata generating security system 100 in accordance with an embodiment. Generally speaking, the metadata generating security system 100 operates to provide information to users in response to requests (e.g., hypertext transfer protocol (HTTP) requests) that are received from the users. The information may include documents (e.g., Web pages, images, audio files, video files, etc.), output of executables, and/or any other suitable type of information. In accordance with example embodiments described herein, the metadata generating security system 100 evaluates a result of enforcement of access control policies instead of enforcing the access control policies.

As shown in FIG. 1, the metadata generating security system 100 includes a plurality of user devices 102A-102M, a network 104, a plurality of servers 106A-106N, a security server 108, and an admin system 110. Communication among the user devices 102A-102M, the servers 106A-106N, the security server 108, and the admin system 110 is carried out over the network 104 using well-known network communication protocols. The network 104 may be a wide-area network (e.g., the Internet), a local area network (LAN), another type of network, or a combination thereof.

The user devices 102A-102M are processing systems that are capable of communicating with the servers 106A-106N. An example of a processing system is a system that includes at least one processor that is capable of manipulating data in accordance with a set of instructions. For instance, a processing system may be a computer, a personal digital assistant, etc. The user devices 102A-102M are configured to provide requests to the servers 106A-106N for requesting information stored on (or otherwise accessible via) the servers 106A-106N. For instance, a user may initiate a request (a.k.a. access request), requesting access to one or more resources 114 that are hosted by or stored among any one or more of the servers 106A-106N. An example of a resource is a computer program (e.g., an application), such as a cloud service or a database. A user may initiate a request for access to a resource (e.g., a request for executing a computer program) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., Web sites) hosted by the servers 104A-104N, so that the user devices 102A-102M may access information that is available via the domains. Such domain may include Web pages, which may be provided as hypertext markup language (HTML) documents and objects (e.g., files) that are linked therein, for example.

The user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more user devices 102A-102M may communicate with any one or more servers 106A-106N.

The servers 106A-106N are processing systems that are capable of communicating with the user devices 102A-102M. The servers 106A-106N are configured to execute computer programs that provide information to users in response to receiving requests from the users. For example, the information may include documents (e.g., Web pages, images, audio files, video files, etc.), output of executables, or any other suitable type of information. In accordance with some example embodiments, the servers 106A-106N are configured to host respective Web sites, so that the Web sites are accessible to users of the metadata generating security system 100.

A security server 108 is a processing system that is capable of communicating with the user devices 102A-102M and the user devices 102A-102M. The security server 108 includes metadata generating security logic 112. The metadata generating security logic 112 is configured to evaluate a result of enforcement of access control policies instead of enforcing the access control policies. For instance, the metadata generating security logic 112 may intercept access requests that are provided by the user devices 102A-102M for purposes of accessing one or more of the resources 114, so that the metadata generating security logic 112 may determine whether access to the resource(s) is to be granted. The metadata generating security logic 112 may take into consideration any of a variety of factors to make the determination. Examples of such a factor include but are not limited to information regarding a user (e.g., identity, group membership); internet protocol (IP) address, platform, and/or state of the user's device; resource to which the user requests access; and real-time and calculated risk associated with the user. The risk associated with a user may be based on (e.g., based at least in part on) the user's sign-in behavior (e.g., repeated failed attempts to access a resource), whether the user's device is a trusted device, whether malware is detected on the user's device, whether the user attempts to sign-in from a location from which the user has signed-in previously, whether the user attempts to sign-in from an IP address that has been flagged as malicious, whether the user attempts to sign-in from multiple locations that are separated by a distance that is greater than a threshold distance within a specified duration of time, etc. For each access control policy for which a result of enforcement is to be evaluated instead of enforcing the access control policy, information regarding the result of enforcement may be generated. The metadata generating security logic 112 may provide a representation of the information for each unenforced access control policy to the admin system 110 for presentation to the IT administrator. The metadata generating security logic 112 may also provide information regarding a result of enforcing access control policies that are, in fact, enforced to the admin system 110 for presentation to the IT administrator.

For example, the metadata generating security logic 112 may authenticate each user who initiates a request to access a resource, review the applicable access policies to determine whether the user is authorized to access the resource, and determine an action that is to be executed and/or documented based on whether the user is authorized to access the resource. For instance, the user may be granted access to the resource, denied access to the resource, or advised to perform an operation (e.g., perform multi-factor authentication or accept terms of use of the resource) to enable the user to be granted access to the resource, or the action may be documented rather than executed.

In a first example implementation, the metadata generating security logic 112 evaluates a result of enforcement of access control policies with regard to sign-in processes instead of enforcing the access control policies with regard to the sign-in processes. Evaluating the result includes monitoring access requests that are received during the sign-in processes. Each access request requests access to a resource. Evaluating the result further includes comparing attributes of each access request against at least a subset of the access control policies that specifies criteria that are to be satisfied as a prerequisite to granting access to the resource to which access is requested by the respective access request. Evaluating the result further includes generating metadata associated with the sign-in processes instead of enforcing the access control policies with regard to the sign-in processes. The metadata indicate whether the attributes of each access request in at least a subset of the access requests satisfy the criteria that are to be satisfied as a prerequisite to granting access to the resource to which access is requested by the respective access request.

In a second example implementation, the metadata generating security logic 112 performs operations to enforce a first access control policy with regard to sign-in processes and to evaluate a result of enforcement of a second access control policy with regard to the sign-in processes instead of enforcing the second access control policy with regard to the sign-in processes. The operations include monitoring access requests that are received during the sign-in processes. Each access request requests access to a resource. The operations further include comparing attributes of each access request against the first access control policy that specifies first criteria that are to be satisfied as a prerequisite to granting access to the resource to which access is requested by the respective access request. The operations further include comparing the attributes of each access request against the second access control policy that specifies second criteria that are to be satisfied as a prerequisite to granting access to the resource to which access is requested by the respective access request. The operations further include enforcing the first access control policy with regard to the sign-in processes. The operations further include generating metadata associated with the sign-in processes instead of enforcing the second access control policy with regard to the sign-in processes. The metadata indicate whether the attributes of each access request in at least a subset of the access requests satisfy the second criteria.

The security server 108 may execute a computer program to implement the functionality of the metadata generating security logic 112, though the scope of the example embodiments is not limited in this respect. One example type of a computer program that may be executed by the security server 108 is a conditional access program. A conditional access program is a computer program that requires criteria to be satisfied as a prerequisite to granting access to resources. Examples of a conditional access program include but are not limited to the Azure® Active Directory® Conditional Access™ program developed and distributed by Microsoft Corporation, the ForgeRock® identity platform developed and distributed by ForgeRock, Inc., and the Auth0® universal identity platform developed and distributed by Auth0, Inc. For instance, the metadata generating security logic 112 may be (or may be included in) a conditional access program.

The admin system 110 is a processing system that is capable of communicating with the security server 108. The admin system 110 is configured to perform operations to facilitate management of the access control properties associated with the enterprise in response to (e.g., based on) instructions that are received from the IT administrator of the enterprise. For example, the admin system 104 may provide commands to the security server 108, indicating a state that is to be applied to each access control policy. For instance, application of a first state to an access control policy may indicate that the access control policy is to be neither evaluated nor enforced. Application of a second state to the access control policy may indicate that the access control policy is to be evaluated and enforced. Application of a third state to the access control policy may indicate that the access control policy is to be evaluated and that a result of enforcement of the access control policy is to be documented in lieu of enforcing the access control policy. The admin system 110 may present (e.g., display) information regarding the result of enforcement of any one or more access control policies (e.g., regardless whether those access control policies were actually enforced).

The metadata generating security logic 112 may be implemented in various ways to evaluate a result of enforcement of access control policies instead of enforcing the access control policies, including being implemented in hardware, software, firmware, or any combination thereof. For example, the metadata generating security logic 112 may be implemented as computer program code configured to be executed in one or more processors. In another example, the metadata generating security logic 112 may be implemented as hardware logic/electrical circuitry. For instance, the metadata generating security logic 112 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

The metadata generating security logic 112 is shown to be incorporated in the security server 108 for illustrative purposes and is not intended to be limiting. It will be recognized that the metadata generating security logic 112 (or any portion(s) thereof) may be incorporated in any one or more of the user devices 102A-102M. For example, client-side aspects of the metadata generating security logic 112 may be incorporated in one or more of the user devices 102A-102M, and server-side aspects of the metadata generating security logic 112 may be incorporated in the security server 108. In another example, the metadata generating security logic 112 may be distributed among the user devices 102A-102M. In yet another example, the metadata generating security logic 112 may be incorporated in a single one of the user devices 102A-102M. In another example, the metadata generating security logic 112 may be distributed among the security server 108 and one or more of the server(s) 106A-106N.

Figure 2:
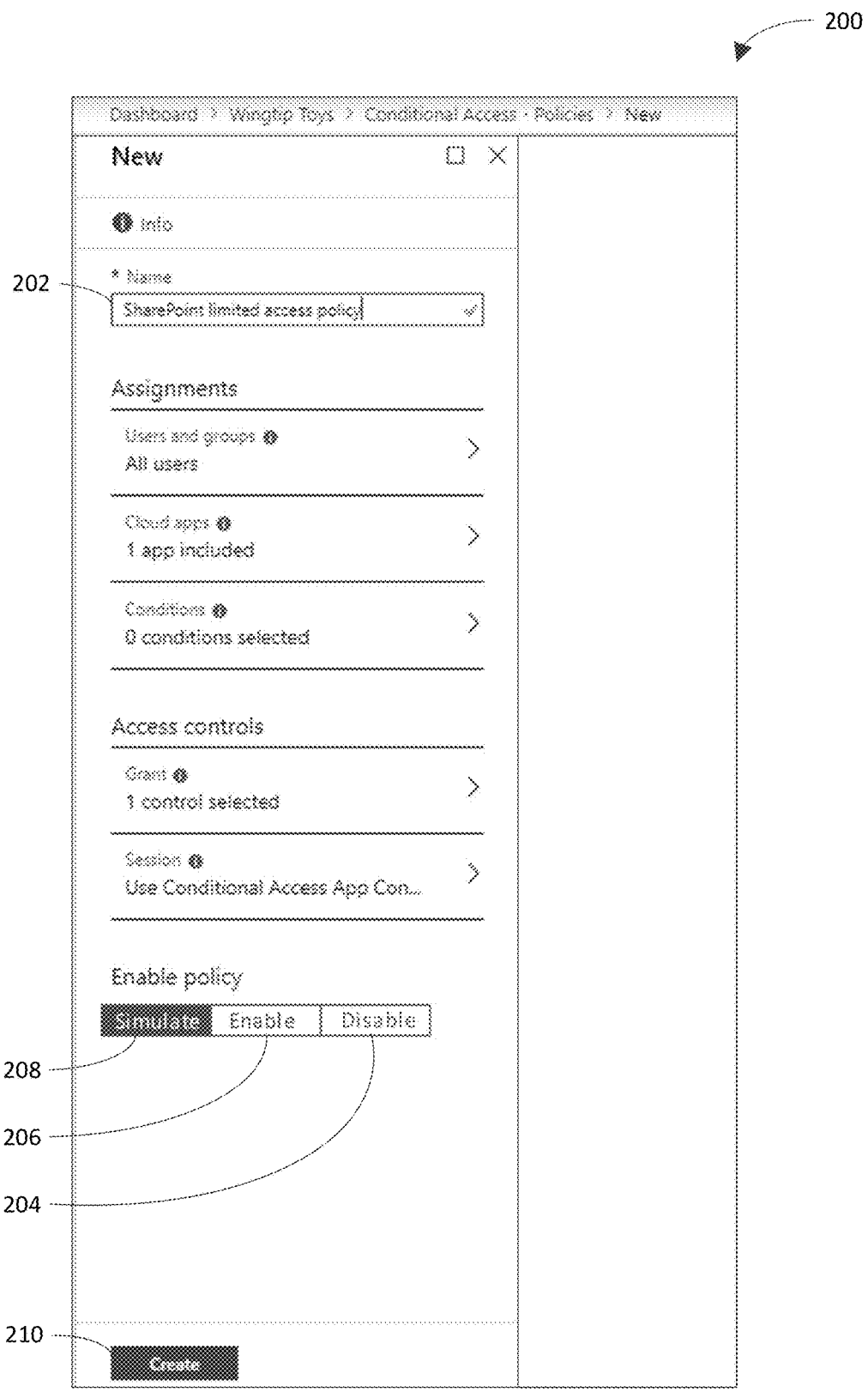
FIG. 2 is a screenshot of an example user interface that enables selection of a state to be applied to an access control policy in accordance with an embodiment.

FIG. 2 is a screenshot 200 of an example user interface that enables selection of a state to be applied to an access control policy in accordance with an embodiment. For instance, the user interface may be presented by an admin system (e.g., admin system 110) for viewing by an IT administrator. The user interface includes a text field 202 in which a name of the access control policy is listed. The IT administrator may select a "Disable" interface element 204 (e.g., virtual button) to select the first state described in the previous paragraph to be applied to the access control policy. The IT administrator may select an "Enable" interface element 206 to select the second state described in the previous paragraph to be applied to the access control policy. The IT administrator may select a "Simulate" interface element 208 to select the third state described in the previous paragraph to be applied to the access control policy. The IT administrator may select a "Create" interface element 210 to create the access control policy in the selected state.

Figure 3:
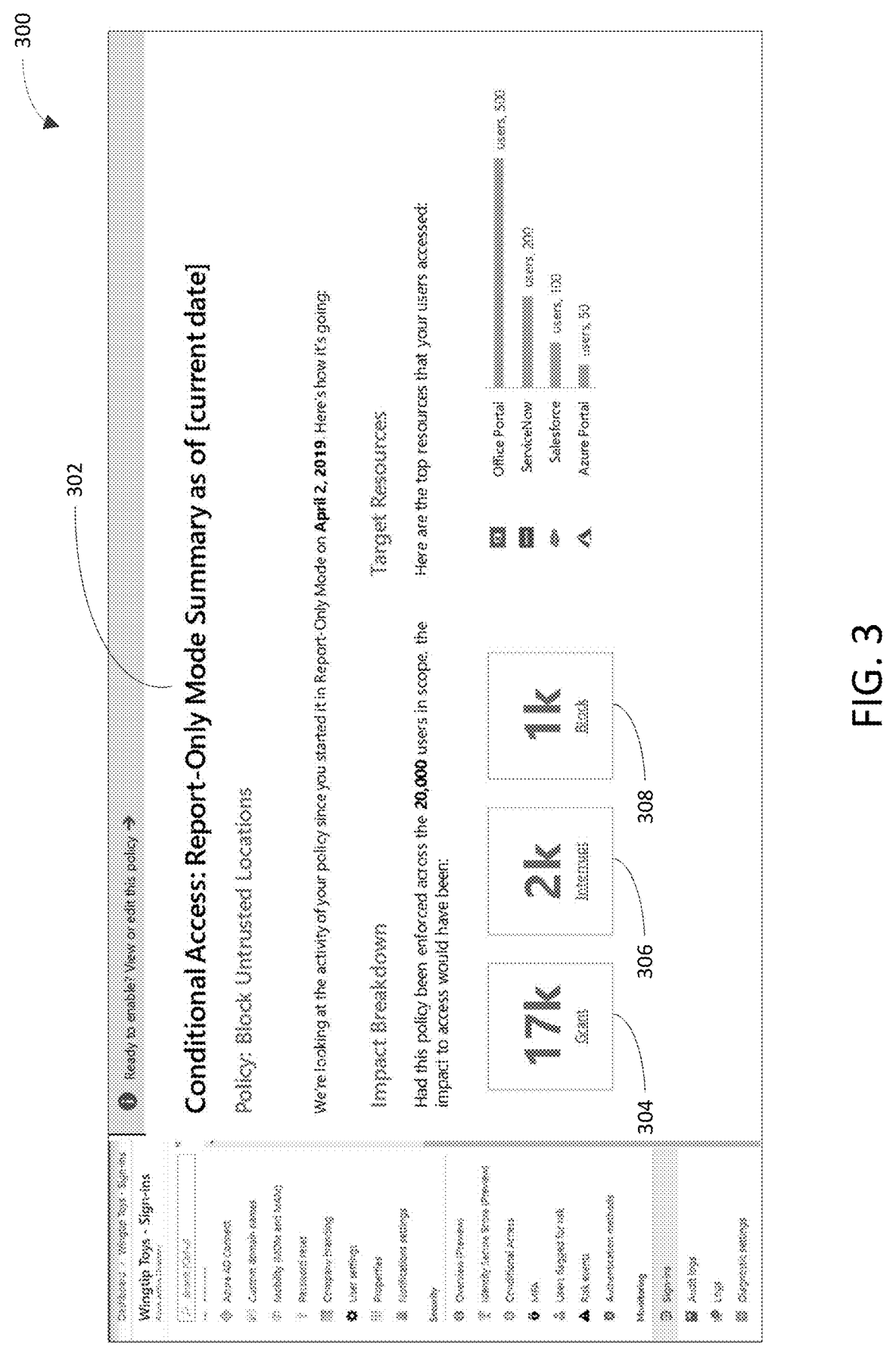

FIG. 3 is a screenshot 300 of an example user interface that provides a representation of a result of enforcement of an access control policy in accordance with an embodiment. The access control policy is named "Block Untrusted Locations" for illustrative purposes. The user interface includes a title 302 of "Conditional Access: Report-Only Mode Summary as of [current date]," which indicates that the third state described above with reference to FIGS. 2 and 3 is applied to the access control policy. Thus, the result of enforcement of the access control policy has been evaluated, and the result has been documented in lieu of enforcing the access control policy. The user interface includes a "Grant" interface element 304, an "Interrupt" interface element 306, and a "Block" interface element 308. The "Grant" interface element 304 indicates that approximately 17,000 end users (from a total of 20,000 end users against whom the access control policy was evaluated) would have been granted access to resources that they requested if the access control policy had been enforced. The "Interrupt" interface element 306 indicates that approximately 2,000 end users (from the total of 20,000 end users) would have been advised to perform an operation to enable the end users to be granted access to resources that they requested if the access control policy had been enforced. The "Block" interface element 308 indicates that approximately 1,000 end users (from the total of 20,000 end users) would have been denied access to resources that they requested if the access control policy had been enforced. The user interface also identifies the resources that would have been accessed the most and the number of users who would have accessed each of those resources if the access control policy had been enforced.

Figure 4:
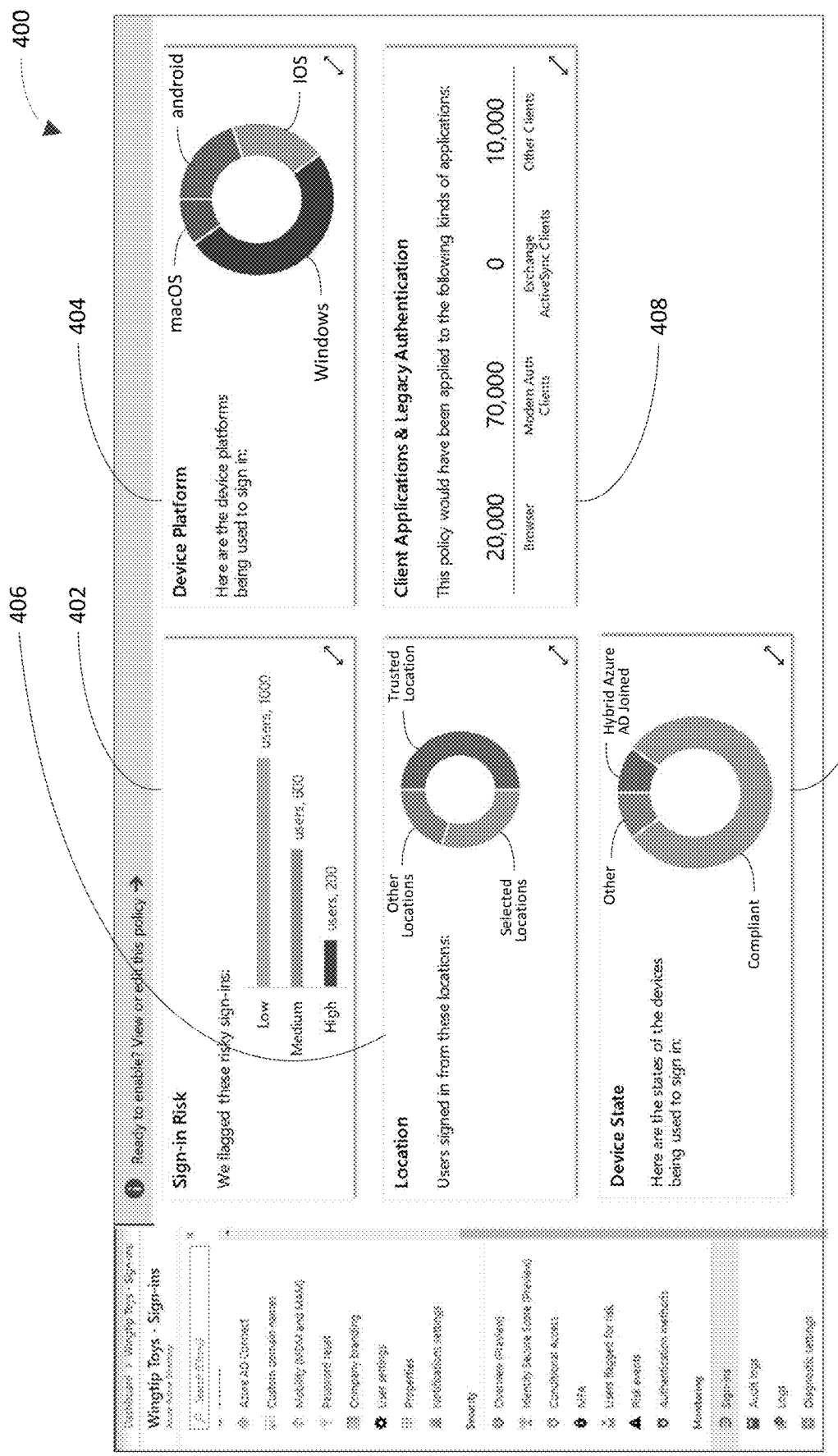
FIGS. 4-9 are screenshots of another example user interface that provides a representation of a result of enforcement of access control policies in accordance with embodiments.

FIGS. 4-9 are screenshots 400, 500, 600, 700, 800, and 900 of another example user interface that provides a representation of a result of enforcement of access control policies in accordance with embodiments. As shown in FIG. 4, the user interface includes a "Sign-in Risk" interface element 402, a "Device Platform" interface element 404, a "Location" interface element 406, a "Client Applications & Legacy Authentication" interface element 408, and a "Device State" interface element 410. The "Sign-in Risk" interface element 402 indicates that 1,000 sign-ins were identified as being a low risk, 600 sign-ins were identified as being a medium risk, and 200 sign-ins were identified as being a high risk.

The "Device Platform" interface element 404 identifies the device platforms that were used to sign-in. The device platforms include Windows®, macOS®, Android®, and IOS®. The "Device Platform" interface element 404 indicates a proportion of each device platform that was used to sign-in.

The "Location" interface element 406 indicates categories of locations from which end users signed-in. The categories include "Selected Locations," "Trusted Locations," and "Other Locations." The "Location" interface element 406 indicates a proportion of each category of locations from which the end users signed-in.

The "Client Applications & Legacy Authentication" interface element 408 indicates categories of applications to which the access control policy would have been applied if the access control policy had been enforced. The categories include "Browser," "Modern Auth Clients," "Exchange ActiveSync Clients," and "Other Clients." The "Client Applications & Legacy Authentication" interface element 408 indicates that 20,000 browsers, 70,000 modern auth clients, 0 exchange activesync clients, and 10,000 other clients.

The "Device State" interface element 410 indicates states of clients that were used to sign-in. The states include "Compliant," "Hybrid Azure AD Joined," and "Other." The "Device State" interface element 410 indicates a proportion of each state among the clients that were used to sign-in.

Figure 5:
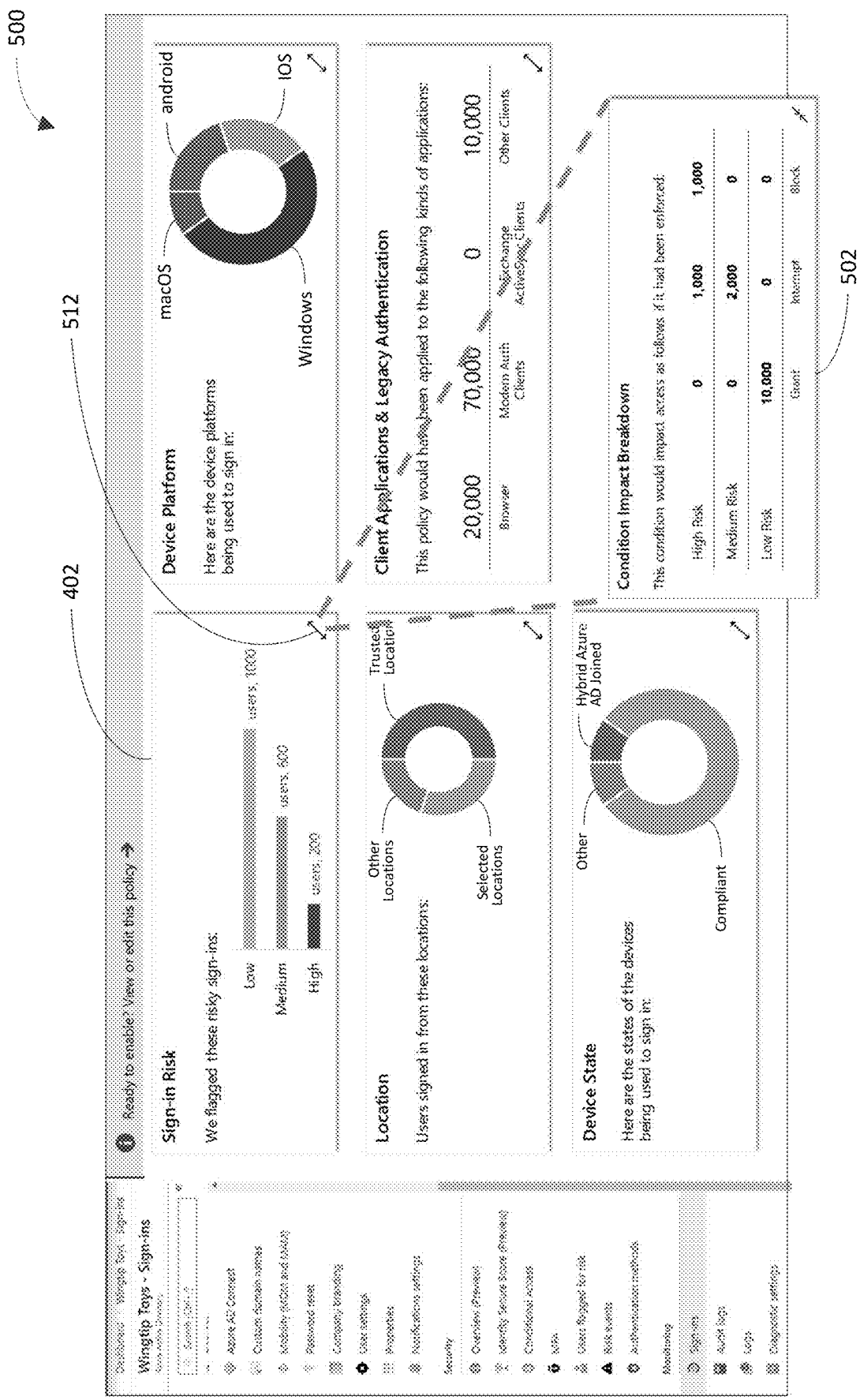

FIG. 5 illustrates that additional (e.g., more detailed) information regarding the subject matter provided in the "Sign-in Risk" interface element 402 may be viewed by selecting an expansion element 512 associated with the "Sign-in Risk" interface element 402. For instance, a "Condition Impact Breakdown" element 502 may be presented in response to the expansion element 512 being selected. The "Condition Impact Breakdown" element 502 indicates how many of the high-risk sign-ins, how many of the medium risk sign-ins, and how many of the low risk sign-ins would have resulted in access to the requested resource being granted; how many of the high-risk sign-ins, how many of the medium risk sign-ins, and how many of the low risk sign-ins would have resulted in the user being advised to perform an operation to enable the end user to be granted access to the requested resource; and how many of the high-risk sign-ins, how many of the medium risk sign-ins, and how many of the low risk sign-ins would have resulted in access to the requested resource being denied (e.g., blocked).

Figure 6:
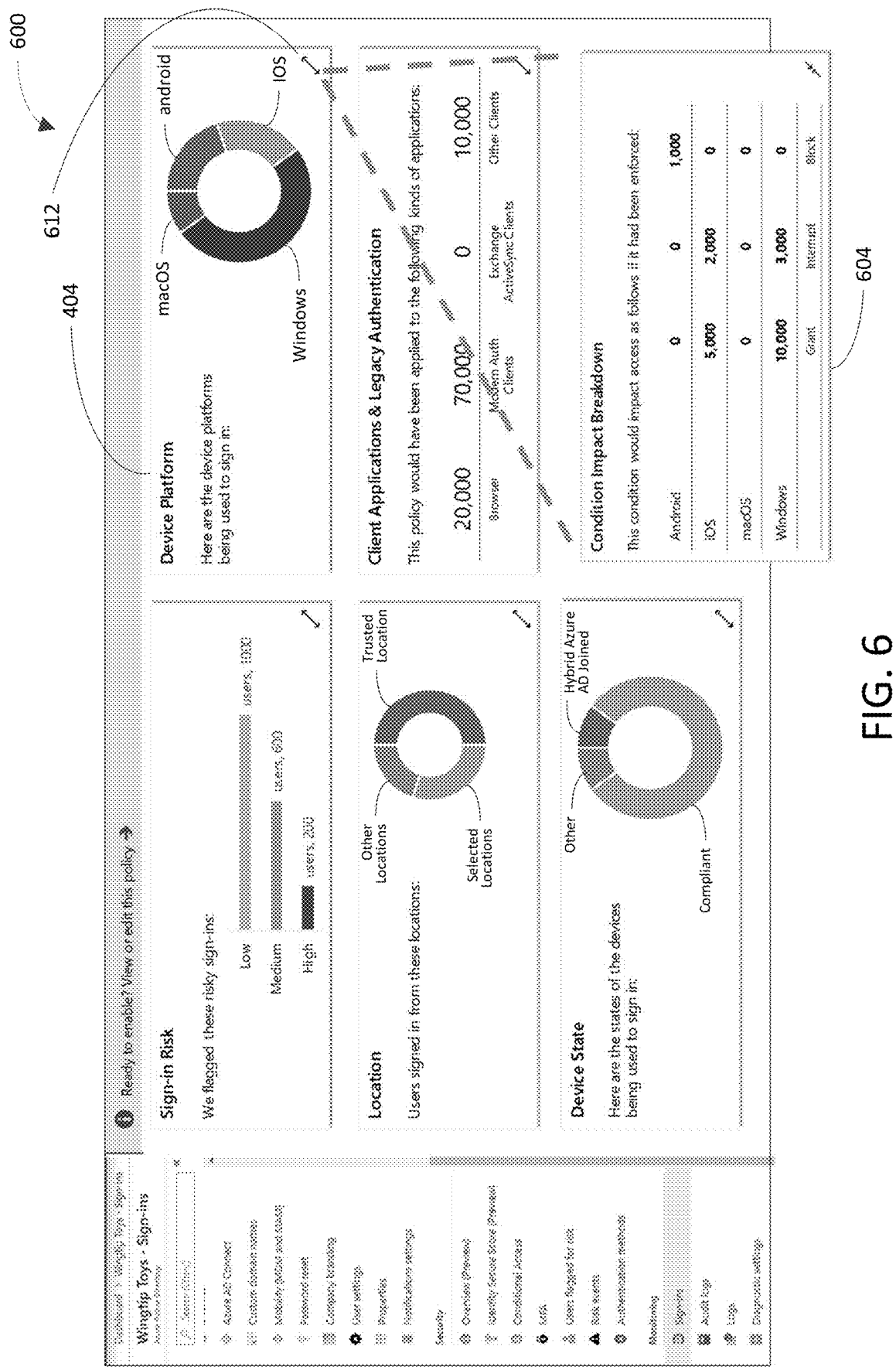

FIG. 6 illustrates that additional information regarding the subject matter provided in the "Device Platform" interface element 404 may be viewed by selecting an expansion element 612 associated with the "Device Platform" interface element 404. For instance, a "Condition Impact Breakdown" element 604 may be presented in response to the expansion element 612 being selected. The "Condition Impact Breakdown" element 604 indicates how many of the sign-ins that were performed using each of the device platforms (i.e., Android®, IOS®, macOS®, and Windows®) would have resulted in access to the requested resource being granted; how many of the sign-ins that were performed using each of the device platforms would have resulted in the user being advised to perform an operation to enable the end user to be granted access to the requested resource; and how many of the sign-ins that were performed using each of the device platforms would have resulted in access to the requested resource being denied.

Figure 7:
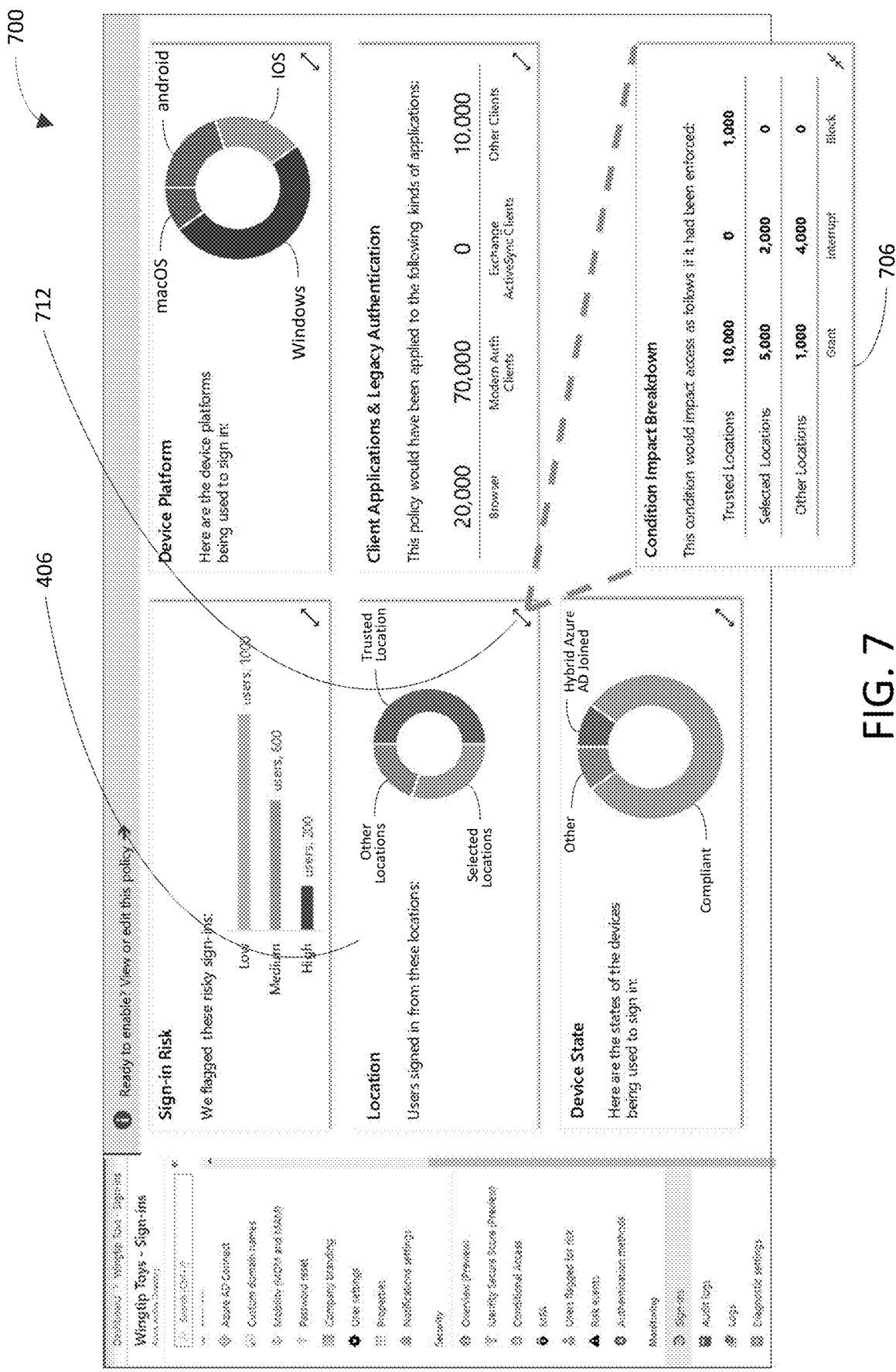

FIG. 7 illustrates that additional information regarding the subject matter provided in the "Location" interface element 406 may be viewed by selecting an expansion element 712 associated with the "Location" interface element 406. For instance, a "Condition Impact Breakdown" element 706 may be presented in response to the expansion element 712 being selected. The "Condition Impact Breakdown" element 706 indicates how many of the sign-ins from each of the categories of locations (i.e., "Trusted Locations," "Selected Locations," and "Other Locations") would have resulted in access to the requested resource being granted; how many of the sign-ins from each of the categories of locations would have resulted in the user being advised to perform an operation to enable the end user to be granted access to the requested resource; and how many of the sign-ins from each of the categories of locations would have resulted in access to the requested resource being denied.

Figure 8:
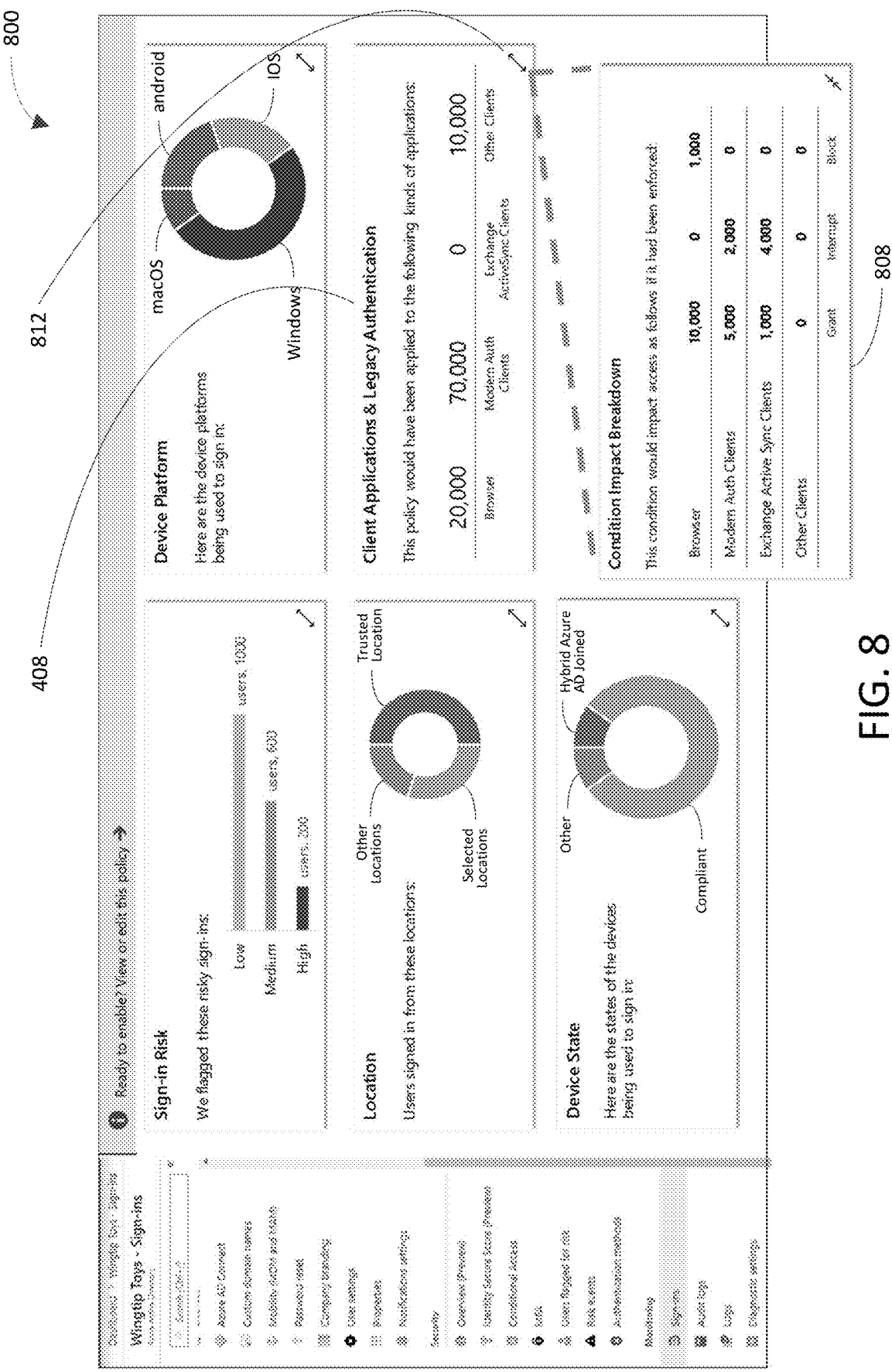

FIG. 8 illustrates that additional information regarding the subject matter provided in the "Client Applications & Legacy Authentication" interface element 408 may be viewed by selecting an expansion element 812 associated with the "Client Applications & Legacy Authentication" interface element 408. For instance, a "Condition Impact Breakdown" element 808 may be presented in response to the expansion element 812 being selected. The "Condition Impact Breakdown" element 808 indicates how many of the sign-ins would have resulted in access to the requested resource being granted for each category of applications (i.e., "Browser," "Modern Auth Clients," "Exchange ActiveSync Clients," and "Other Clients") to which the access control policy would have been applied; how many of the sign-ins would have resulted in the user being advised to perform an operation to enable the end user to be granted access to the requested resource for each category of applications to which the access control policy would have been applied; and how many of the sign-ins would have resulted in access to the requested resource being denied for each category of applications to which the access control policy would have been applied.

Figure 9:
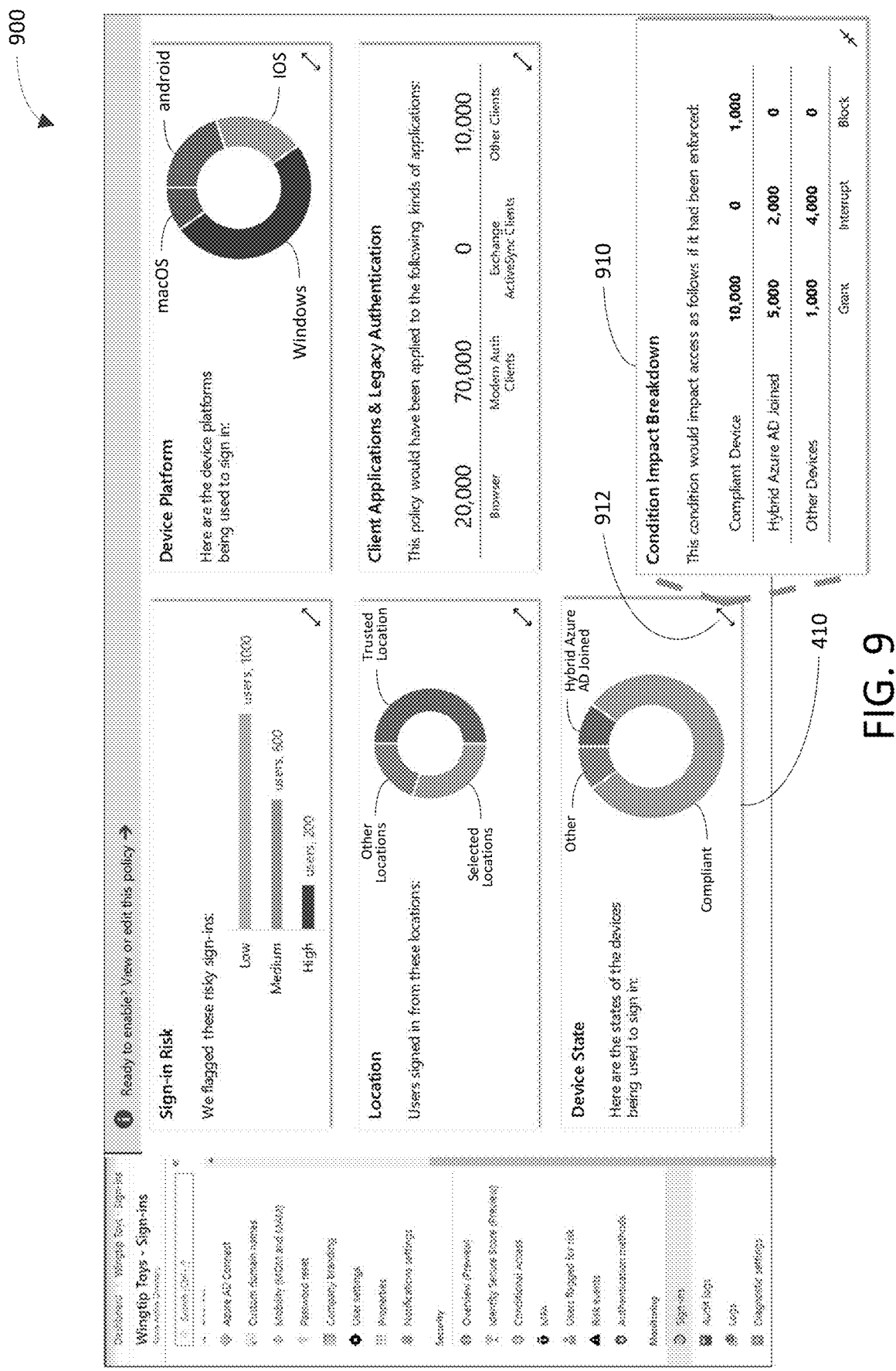

FIG. 9 illustrates that additional information regarding the subject matter provided in the "Device State" interface element 410 may be viewed by selecting an expansion element 912 associated with the "Device State" interface element 410. For instance, a "Condition Impact Breakdown" element 910 may be presented in response to the expansion element 912 being selected. The "Condition Impact Breakdown" element 910 indicates how many of the sign-ins that were performed using a device in each state ("Compliant," "Hybrid Azure AD Joined," and "Other") would have resulted in access to the requested resource being granted; how many of the sign-ins that were performed using a device in each state would have resulted in the user being advised to perform an operation to enable the end user to be granted access to the requested resource; and how many of the sign-ins that were performed using a device in each state would have resulted in access to the requested resource being denied.

Figure 10:
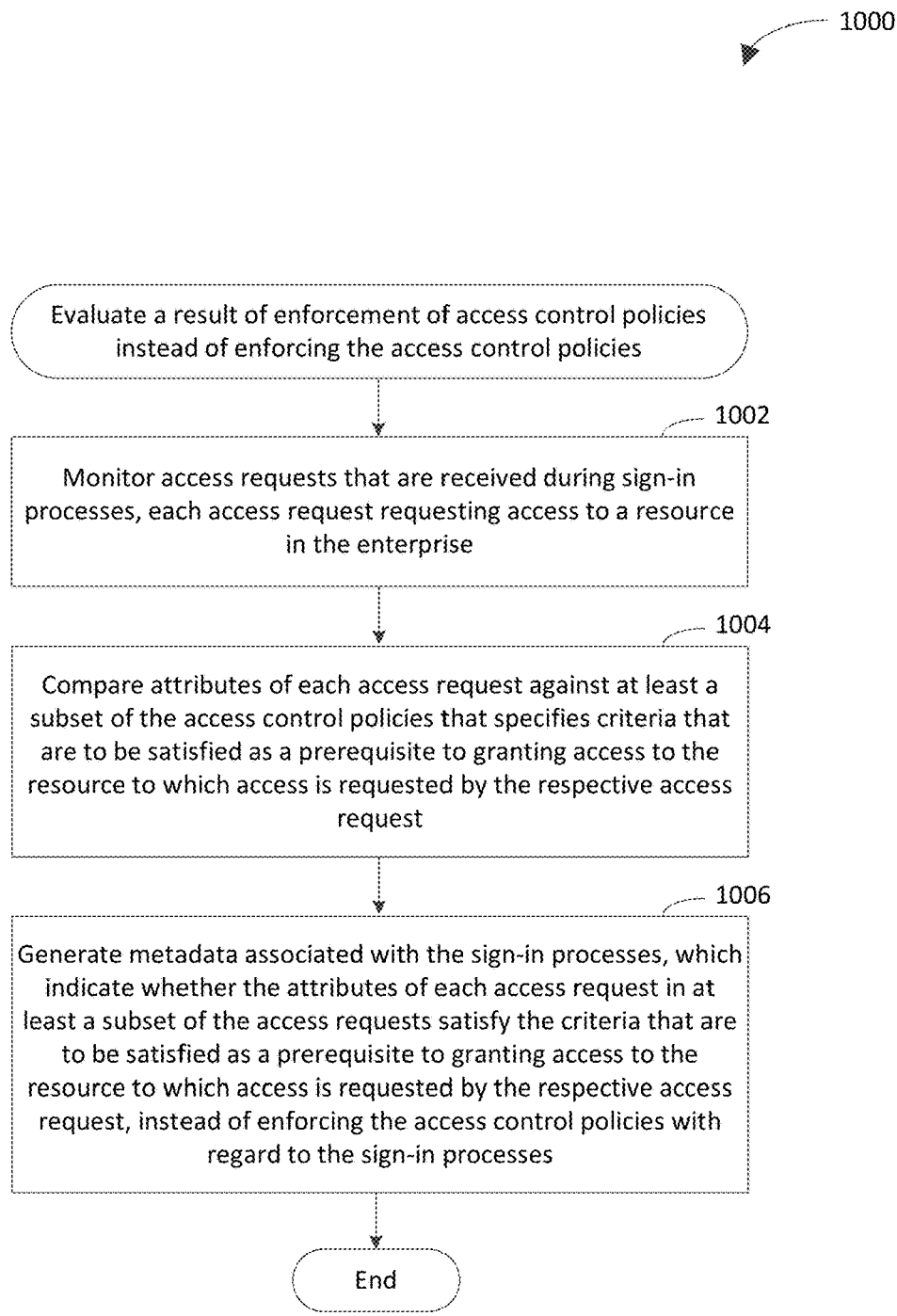
FIGS. 10-11 depict flowcharts of example methods for evaluating a result of enforcement of access control policies instead of enforcing the access control policies in accordance with embodiments.
Figure 11:
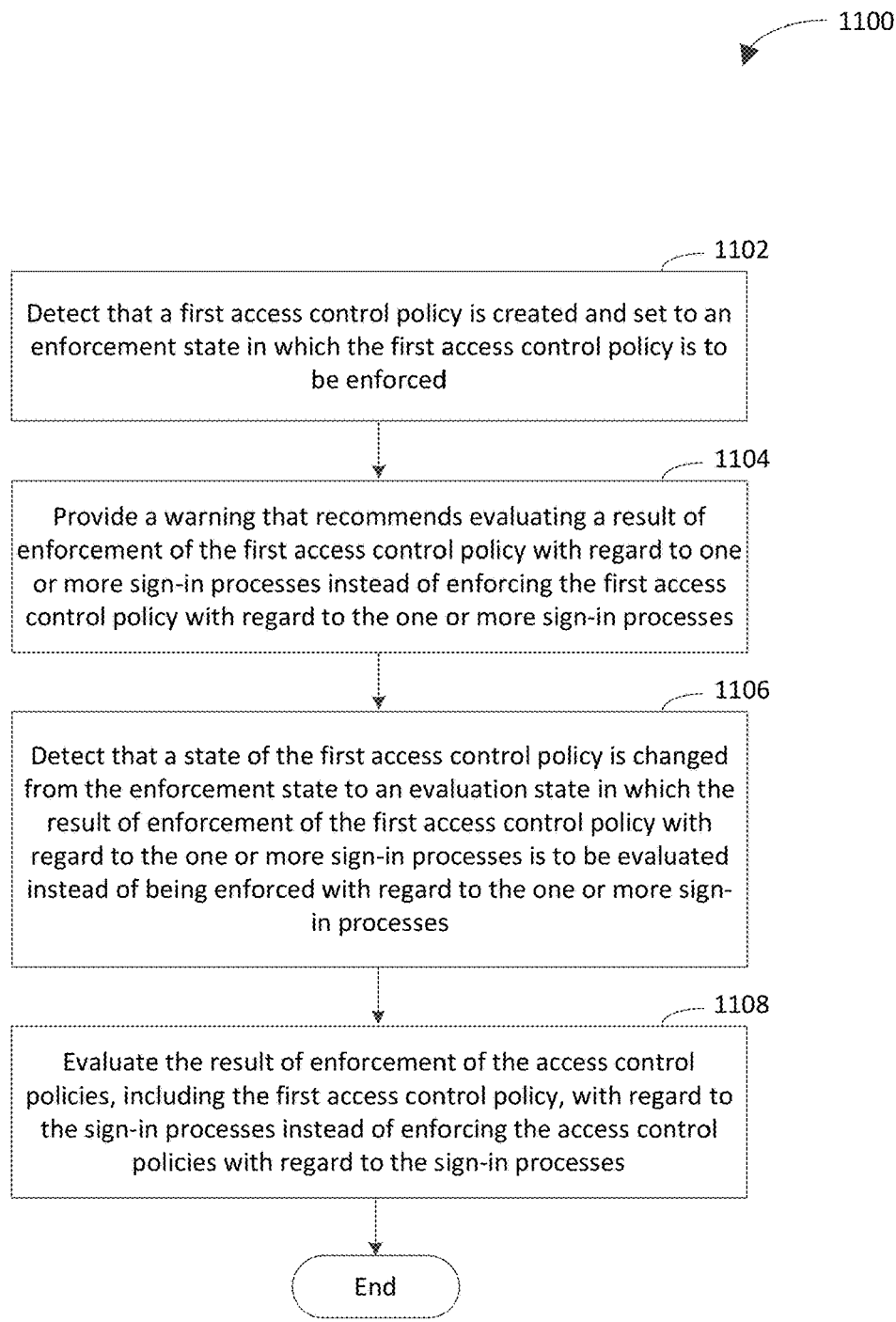
Figure 12:
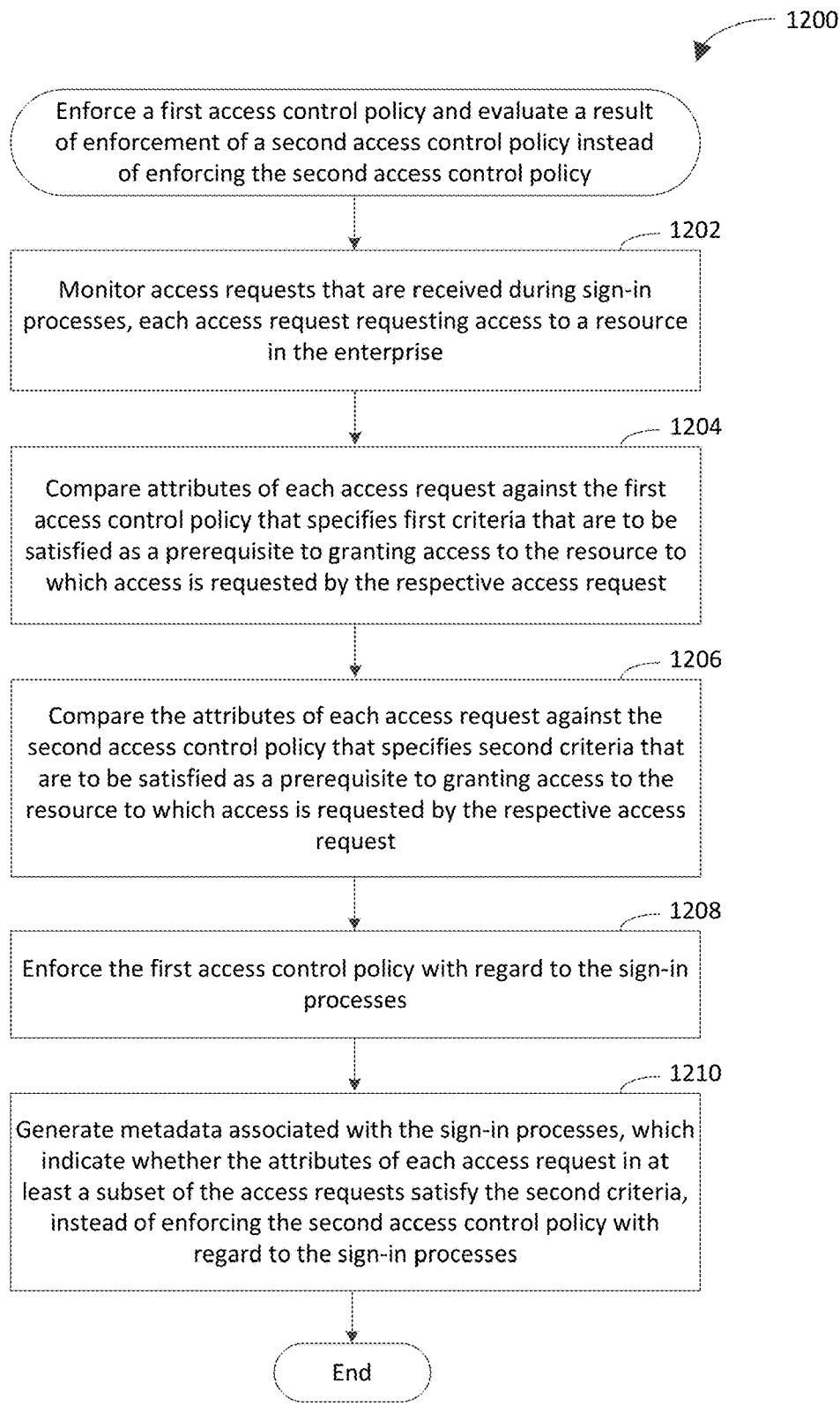
FIG. 12 depicts a flowchart of an example method for enforcing a first access control policy and evaluating a result of enforcement of a second access control policy instead of enforcing the second access control policy in accordance with an embodiment.
Figure 13:
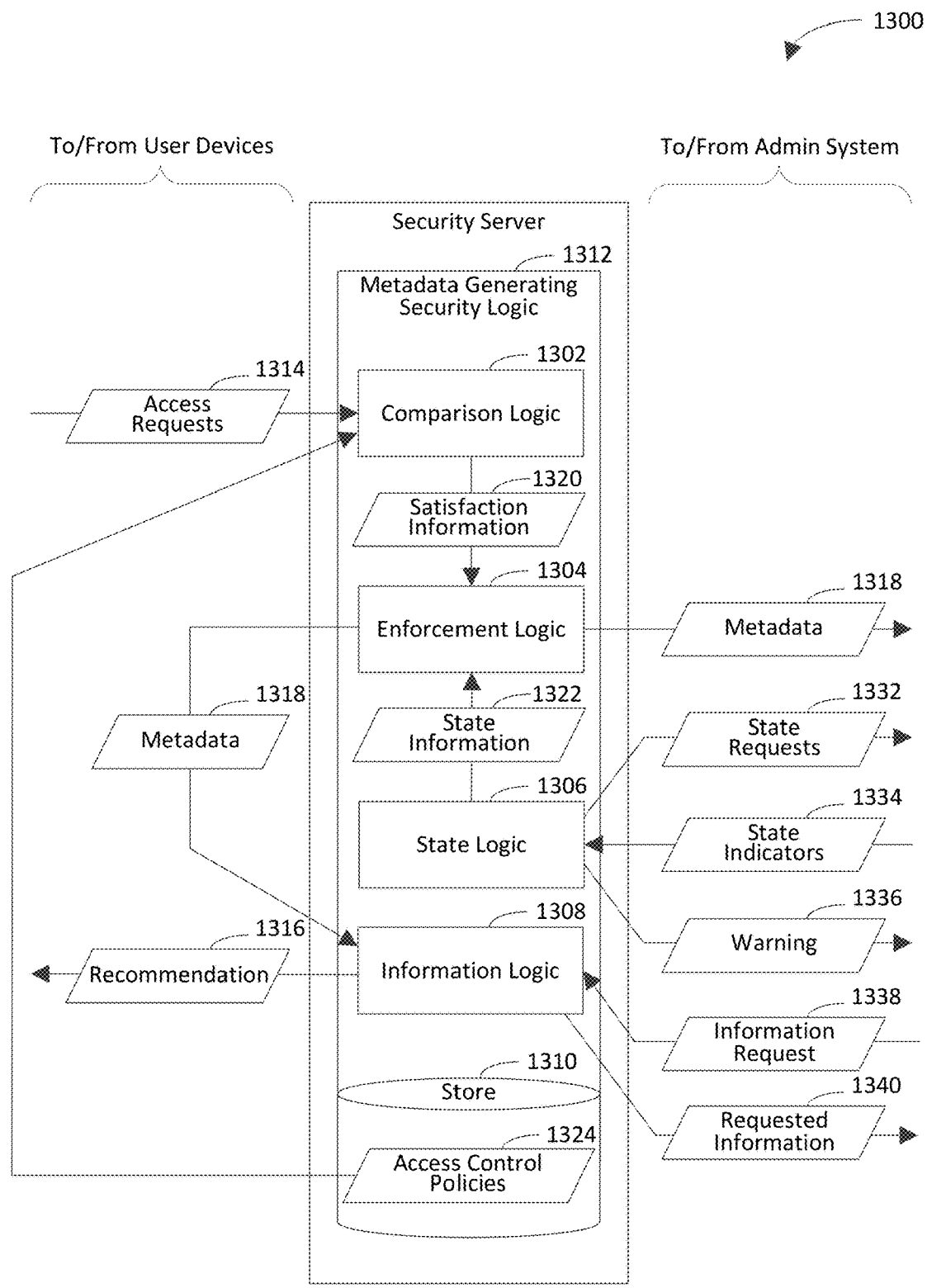
FIG. 13 is a block diagram of an example implementation of a security server shown in FIG. 1 in accordance with an embodiment.

FIGS. 10-11 depict flowcharts 1000 and 1100 of example methods for evaluating a result of enforcement of access control policies instead of enforcing the access control policies in accordance with embodiments. FIG. 12 depicts a flowchart 1200 of an example method for enforcing a first access control policy and evaluating a result of enforcement of a second access control policy instead of enforcing the second access control policy in accordance with an embodiment. Flowcharts 1000, 1100, and 1200 may be performed by the metadata generating security logic 112 shown in FIG. 1, for example. For illustrative purposes, flowcharts 1000, 1100, and 1200 are described with respect to a security server 1300 shown in FIG. 13. The security server 1300 includes metadata generating security logic 1312, which is an example implementation of the metadata generating security logic 112, according to an embodiment. As shown in FIG. 13, the metadata generating security logic 1312 includes comparison logic 1302, enforcement logic 1304, state logic 1306, information logic 1308, and a store 1310. Further structural and operational embodiments will be apparent to persons skilled in the relevant art(s) based on the discussion regarding flowcharts 1000, 1100, and 1200.

As shown in FIG. 10, the method of flowchart 1000 begins at step 1002. In step 1002, access requests that are received during sign-in processes are monitored. Each access request requests access to a resource in the enterprise. In an example implementation, the comparison logic 1302 monitors access requests 1314 that are received during the sign-in processes (a.k.a. sign-in events). Each of the access requests 1314 requests access to a resource in the enterprise.

At step 1004, attributes of each access request are compared against at least a subset of the access control policies that specifies criteria that are to be satisfied as a prerequisite to granting access to the resource to which access is requested by the respective access request. In an example implementation, the comparison logic 1302 compares attributes of each of the access requests 1314 against at least a subset of the access control policies 1324. The access control policies 1324 are stored in the store 1310. The comparison logic 1302 may retrieve the access control policies 1324 from the store 1310 to enable each access request to be compared with a subset of the access control policies 1324. In accordance with this implementation, the comparison logic 1302 may generate satisfaction information 1320 based on a comparison of the attributes of each of the access requests 1314 against at least a subset of the access control policies 1324. For instance, the satisfaction information 1320 may indicate (e.g., specify) whether the attributes of each access request satisfy the criteria that are specified by the subset of the access control policies 1324 that corresponds to the respective access request. The store 1310 may be any suitable type of store. One type of store is a database. For instance, the store 1310 may be a relational database, an entity-relationship database, an object database, an object relational database, an extensible markup language (XML) database, etc.

At step 1006, metadata associated with the sign-in processes are generated instead of enforcing the access control policies with regard to the sign-in processes. The metadata indicate whether the attributes of each access request in at least a subset of the access requests satisfy the criteria that are to be satisfied as a prerequisite to granting access to the resource to which access is requested by the respective access request. In an example implementation, the enforcement logic 1304 generates metadata 1318 associated with the sign-in processes instead of enforcing the access control policies 1324 with regard to the sign-in processes. For instance, the enforcement logic 1304 may generate an object that includes the metadata, though the scope of the example embodiments is not limited in this respect. The metadata 1318 indicate whether the attributes of each access request in at least a subset of the access requests satisfy the criteria that are to be satisfied as a prerequisite to granting access to the resource to which access is requested by the respective access request.

In an example embodiment, generating the metadata at step 1006 includes generating the metadata to be platform-agnostic such that the metadata is extensible to arbitrary platforms through an API.

In another example embodiment, comparing the attributes of each access request against at least a subset of the access control policies at step 1004 includes comparing first attributes of one or more first access requests against a first access control policy that does not affect a result of enforcement of a second access control policy and that specifies one or more first criteria that are to be satisfied as a prerequisite to granting access to one or more first resources. In accordance with this embodiment, comparing the attributes at step 1004 further includes comparing second attributes of one or more second access requests against the second access control policy that does not affect a result of enforcement of the first access control policy and that specifies one or more second criteria that are to be satisfied as a prerequisite to granting access to one or more second resources. In further accordance with this embodiment, generating the metadata at step 1006 includes generating the metadata by aggregating first metadata, which indicate whether the first attributes of the one or more first access requests satisfy the one or more first criteria, and second metadata, which indicate whether the second attributes of the one or more second access requests satisfy the one or more second criteria.

In some example embodiments, one or more steps 1002, 1004, and/or 1006 of flowchart 1000 may not be performed. Moreover, steps in addition to or in lieu of steps 1002, 1004, and/or 1006 may be performed. For instance, in an example embodiment, the method of flowchart 1000 further includes selecting a designated state from a plurality of states that are available to be applied to a specified access control policy in response to instructions that are received via a user interface. The plurality of states includes a first state, a second state, and a third state. In the first state, the access requests are not to be compared against the specified access control policy and the specified access control policy is not to be enforced with regard to the sign-in processes. In the second state, at least a subset of the access requests is to be compared against the specified access control policy and the specified access control policy is to be enforced with regard to the sign-in processes. In the third state, at least a subset of the access requests is to be compared against the specified access control policy, and metadata associated with the sign-in processes are to be generated instead of enforcing the specified access control policy with regard to the sign-in processes. In an example, the state logic 1306 selects the designated state in response to the instructions. For instance, the state logic 1306 may select the designated state based on the state indicators 1334, which may be based on the instructions. In accordance with this embodiment, generating the metadata at step 1006 includes generating the metadata instead of enforcing the specified access control policy with regard to the sign-in processes based on the third state being selected as the designated state from the plurality of states to be applied to the specified access control policy. For example, the state logic 1306 may generate the state information 1322 to indicate that the third state is selected as the designated state to be applied to the specified access control policy. In accordance with this example, the enforcement logic 1304 may generate the metadata instead of enforcing the specified access control policy with regard to the sign-in processes in response to receipt of the state information 1322 (e.g., based on the state information 1322 indicating that the third state is selected as the designated state to be applied to the specified access control policy).

In another example embodiment, comparing the attributes of each access request against at least a subset of the access control policies at step 1004 includes comparing first attributes of one or more first access requests against a first access control policy that specifies one or more first criteria that are to be satisfied as a prerequisite to granting access to one or more first resources. In accordance with this example embodiment, comparing the attributes of each access request against at least a subset of the access control policies at step 1004 further includes comparing second attributes of one or more second access requests against a second access control policy that specifies one or more second criteria that are to be satisfied as a prerequisite to granting access to one or more second resources. In further accordance with this embodiment, generating the metadata at step 1006 includes generating first metadata and second metadata. The first metadata indicate whether the first attributes of the one or more first access requests satisfy the one or more first criteria. The second metadata indicate whether the second attributes of the one or more second access requests satisfy the one or more second criteria. In further accordance with this embodiment, the method of flowchart 1000 further includes causing a comparison of a first representation of a first result of enforcement of the first access control policy and a second representation of a second result of enforcement of the second access control policy to be displayed via a user interface. The first representation of the first result of enforcement of the first access control policy indicates an extent to which the first attributes of the one or more first access requests satisfy at least one (e.g., all) of the one or more first criteria based on the first metadata. The second representation of the second result of enforcement of the second access control policy indicates an extent to which the second attributes of the one or more second access requests satisfy at least one (e.g., all) of the one or more second criteria based on the second metadata.

For example, the information logic 1308 may cause the comparison of the first representation of the first result and the second representation of the second result to be displayed via a user interface. In accordance with this example, the information logic 1308 may generate requested information 1340 to describe the first and second representations of the respective first and second results and/or the comparison thereof based on the metadata 1318. Providing the requested information 1340 to an admin system may cause the admin system to display the comparison of the first and second representations of the respective first and second results via a user interface of the admin system. The information logic 1308 may generate the requested information 1340 based on an information request 1338. For instance, the information request 1338 may be based on instructions that are received from an IT administrator via a user interface. For example, the instructions from the IT administrator (and the resulting information request 1338) may specify that the first and second representations of the respective first and second results are to be compared. In accordance with this example, the information logic 1308 may generate the requested information 1340 to describe the first and second representations of the respective first and second results and/or the comparison thereof based on the information request 1338 specifying that the first and second representations of the respective first and second results are to be compared.

In yet another example embodiment, the method of flowchart 1000 includes determining which users from a plurality of users who initiate the access requests use a legacy authentication technique to request access to at least one resource in the enterprise based on the metadata. For instance, the information logic 1308 may determine which users from the plurality of users who initiate the access requests 1314 use a legacy authentication technique based on the metadata 1318. For example, the metadata 1318 may indicate which users use the legacy authentication technique. In accordance with this embodiment, the method of flowchart 1000 includes providing an indicator that specifies (a) a number of the users who use the legacy authentication technique and/or (b) an identity of each of the users who use the legacy authentication technique. For example, the information logic 1308 may provide the indicator. In accordance with this example, the information logic 1308 may generate the requested information 1340 to include the indicator.

In still another example embodiment, the method of flowchart 1000 includes determining which applications from a plurality of applications are accessed by a specified access control policy based on the metadata. For instance, the information logic 1308 may determine which applications are accessed by the specified access control policy based on the metadata 1318. For example, the metadata may indicate which applications are accessed by the specified access control policy. In accordance with this embodiment, the method of flowchart 1000 includes providing an indicator that specifies (a) a number of the applications that are accessed by the specified access control policy and/or (b) an identity of each of the applications that are accessed by the specified access control policy. For example, the information logic 1308 may provide the indicator. In accordance with this example, the information logic 1308 may generate the requested information 1340 to include the indicator.

In yet another example embodiment, the method of flowchart 1000 includes one or more steps shown in flowchart 1100 of FIG. 11. As shown in FIG. 11, the method of flowchart 1100 begins at step 1102. In step 1102, creation of a first access control policy and setting of the first access control policy to an enforcement state in which the first access control policy is to be enforced are detected. In an example implementation, the state logic 1306 detects that the first access control policy is created and set to the enforcement state in which the first access control policy is to be enforced. For instance, the state logic 1306 may provide state requests 1332, requesting information that indicates the states that are applied to the access control policies 1324. The state logic 1306 may provide the state requests 1332 through a user interface, such as the user interface shown in screenshot 200 of FIG. 2. The IT admin may provide instructions to an admin system (e.g., admin system 110), indicating any new access control policies that are to be included among the access control policies 124 and selecting the states that are to be applied to the access control policies 1324. The admin system may generate state indicators 1334 based on the IT admin's instructions. The state logic 1306 may detect that the first access control policy is created and set to the enforcement state based on the state indicators 1334 (e.g., based on the state indicators 1334 indicating that the first access control policy has been created and set to the enforcement state). The state logic 1306 may generate state information 1322, indicating the states that are to be applied to the access control policies 1324.

At step 1104, a warning that recommends evaluating a result of enforcement of the first access control policy with regard to one or more sign-in processes instead of enforcing the first access control policy with regard to the one or more sign-in processes is provided. In an example implementation, state logic 1306 provides a warning 1336 that recommends evaluating the result of enforcement of the first access control policy with regard to one or more sign-in processes instead of enforcing the first access control policy with regard to the one or more sign-in processes.

At step 1106, changing of a state of the first access control policy from the enforcement state to an evaluation state is detected. In the evaluation state, the result of enforcement of the first access control policy with regard to the one or more sign-in processes is to be evaluated instead of being enforced with regard to the one or more sign-in processes. In an example implementation, the state logic 1306 detects that the state of the first access control policy is changed from the enforcement state to the evaluation state. For instance, the state logic 1306 may detect the change based on the state indicators 1334 indicating that the state of the first access control policy is changed from the enforcement state to the evaluation state. The state logic 1306 may update the state information 1322 to indicate the change.

At step 1108, the result of enforcement of the access control policies, including the first access control policy, with regard to the sign-in processes is evaluated instead of enforcing the access control policies with regard to the sign-in processes. In an example implementation, the enforcement logic 1304 evaluates the result of enforcement of the access control policies 1324, including the first access control policy, with regard to the sign-in processes instead of enforcing the access control policies 1324 with regard to the sign-in processes.

As shown in FIG. 11, the method of flowchart 1100 begins at step 1102. In step 1102, access requests that are received during sign-in processes are monitored. Each access request requests access to a resource in the enterprise. In an example implementation, the comparison logic 1302 monitors the access requests 1314 that are received during the sign-in processes.

At step 1204, attributes of each access request are compared against the first access control policy that specifies first criteria that are to be satisfied as a prerequisite to granting access to the resource to which access is requested by the respective access request. In an example implementation, the comparison logic 1302 compares the attributes of each of the access requests 1314 against the first access control policy. In accordance with this implementation, the comparison logic 1302 may generate the satisfaction information 1320 based on a comparison of the attributes of each of the access requests 1314 against the first access control policy. For instance, the satisfaction information 1320 may indicate (e.g., specify) whether the attributes of each access request satisfy the criteria that are specified by the first access control policy.

At step 1206, the attributes of each access request are compared against the second access control policy that specifies second criteria that are to be satisfied as a prerequisite to granting access to the resource to which access is requested by the respective access request. In an example implementation, the comparison logic 1302 compares the attributes of each of the access requests 1314 against the second access control policy. In accordance with this implementation, the comparison logic 1302 may generate the satisfaction information 1320 further based on a comparison of the attributes of each of the access requests 1314 against the second access control policy. For instance, the satisfaction information 1320 may indicate whether the attributes of each access request satisfy the criteria that are specified by the second access control policy.

At step 1208, the first access control policy is enforced with regard to the sign-in processes. In an example implementation, the enforcement logic 1304 enforces the first access control policy with regard to the sign-in processes.

At step 1210, metadata associated with the sign-in processes is generated instead of enforcing the second access control policy with regard to the sign-in processes. The metadata indicate whether the attributes of each access request in at least a subset of the access requests satisfy the second criteria. In an example implementation, the enforcement logic 1304 generates metadata 1318 associated with the sign-in processes instead of enforcing the second access control policy with regard to the sign-in processes. The metadata 1318 indicate whether the attributes of each access request in at least a subset of the access requests satisfy the second criteria.

In an example embodiment, generating the metadata at step 1210 includes generate the metadata, which further indicates whether the attributes of each access request in at least a subset of the access requests satisfy the first criteria. In accordance with this embodiment, a first portion of the metadata indicates an actual result that occurs as a result of the first access policy being enforced with regard to the sign-in processes. In further accordance with this embodiment, a second portion of the metadata indicates the result of enforcement of the second access control policy that would have occurred with regard to the sign-in processes had the second access control policy been enforced with regard to the sign-in processes.

In some example embodiments, one or more steps 1202, 1204, 1206, 1208, and/or 1210 of flowchart 1200 may not be performed. Moreover, steps in addition to or in lieu of steps 1202, 1204, 1206, 1208, and/or 1210 may be performed. For instance, in an example embodiment, a plurality of states are available to be applied to each of a plurality of access control policies that include the first access control policy and the second access control policy. The plurality of states includes a first state, a second state, and a third state. In the first state, the access requests are not to be compared against the respective access control policy, and the respective access control policy is not to be enforced with regard to the sign-in processes. In the second state, at least a subset of the access requests is to be compared against the respective access control policy, and the respective access control policy is to be enforced with regard to the sign-in processes. In the third state, at least a subset of the access requests is to be compared against the respective access control policy, and metadata associated with the sign-in processes are to be generated instead of enforcing the respective access control policy with regard to the sign-in processes. In accordance with this embodiment, the method of flowchart 1200 further includes selecting the second state from the plurality of states to be applied to the first access control policy in response to first instructions that are received via a user interface. For instance, the state logic 1306 may select the second state to be applied to the first access control policy in response to the first instructions. In further accordance with this embodiment, the method of flowchart 1200 further includes selecting the third state from the plurality of states to be applied to the second access control policy in response to second instructions that are received via the user interface. For instance, the state logic 1306 may select the third state to be applied to the second access control policy in response to the second instructions. The state logic 1306 may generate the state information 1322 to indicate that the second state is to be applied to the first access control policy and the third state is to be applied to the second access control policy. In further accordance with this embodiment, enforcing the first access control policy at step 1208 is based on the second state being selected from the plurality of states to be applied to the first access control policy. For example, the enforcement logic 1304 may enforce the first access control policy in response to the state information 1322 indicating that the second state is to be applied to the first access control logic. In further accordance with this embodiment, generating the metadata at step 1210 is based on the third state being selected from the plurality of states to be applied to the second access control policy. For instance, the enforcement logic 1304 may generate the metadata 1318 in response to the state information 1322 indicating that the third state is to be applied to the second access control logic.

In another example embodiment, the method of flowchart 1200 further includes causing a comparison of a first representation of the actual result that occurs as a result of the first access policy being enforced with regard to the sign-in processes and a second representation of the result of enforcement of the second access control policy that would have occurred with regard to the sign-in processes had the second access control policy been enforced with regard to the sign-in processes to be displayed via a user interface. In accordance with this embodiment, the first representation indicates an extent to which the attributes of each access request satisfy at least one (e.g., all) of the first criteria based on the first portion of the metadata. In further accordance with this embodiment, the second representation indicates an extent to which the attributes of each access request satisfy at least one (e.g., all) of the second criteria based on the second portion of the metadata. For instance, the information logic 1308 may cause the comparison of the first representation and the second representation to be displayed via a user interface. In accordance with this example, the information logic 1308 may generate requested information 1340 to describe the first and second representations and/or the comparison thereof based on the metadata 1318. Providing the requested information 1340 to an admin system may cause the admin system to display the comparison of the first and second representations via a user interface of the admin system. The information logic 1308 may generate the requested information 1340 based on an information request 1338. For instance, the information request 1338 may be based on instructions that are received from an IT administrator via a user interface. For example, the instructions from the IT administrator (and the resulting information request 1338) may specify that the first and second representations are to be compared. In accordance with this example, the information logic 1308 may generate the requested information 1340 to describe the first and second representations and/or the comparison thereof based on the information request 1338 specifying that the first and second representations are to be compared.

In yet another example embodiment, the method of flowchart 1200 further includes enabling selection of any one or more of a plurality of access control policies via a first user interface to define a control policy selection regardless whether each access control policy in the control policy selection is enforced. The plurality of access control policies includes the first access control policy and the second access control policy. For example, the information logic 1308 may provide an indication of the plurality of access control policies 1324 to an admin system, enabling an IT administrator associated with the admin system to select any one or more of the access control policies 1324 via a first user interface of the admin system to define the control policy selection. In accordance with this example, the information logic 1308 may generate the requested information 1340 to include the indication of the plurality of access control policies 1324. In accordance with this embodiment, the method of flowchart 1200 further includes causing a representation of a result of enforcement of the control policy selection to be displayed via a second user interface based on the control policy selection being defined by selection via the first user interface. For instance, by providing the indication of the plurality of access control policies 1324 to the admin system, the information logic 1308 may cause the representation of the result of enforcement of the control policy selection to be displayed via a second user interface of the admin system. The first user interface and the second user interface may be same or different. The representation of the result of enforcement of the control policy selection may exclude a result of enforcement of each access control policy in the plurality of access control policies that is not included in the control policy selection, though a representation of the result of enforcement of any one or more access control policies in the plurality of access control policies that are not included in the control policy selection may be displayed in addition to the representation of the result of enforcement of the control policy selection.

In still another example embodiment, the method of flowchart 1200 further includes causing a policy satisfaction indicator for each access request in at least the subset of the access requests to be displayed via a user interface. Each policy satisfaction indicator indicates that (a) the attributes of the respective access request satisfy the second criteria, and grant controls are satisfied (e.g., "Success"); (b) the attributes of the respective access request satisfy the second criteria, and at least one of the grant controls is not satisfied (e.g., "Failure"); (c) the attributes of the respective access request satisfy the second criteria, and satisfaction of at least one of the grant controls is dependent on performance of a future action by a user who initiated the respective access request (e.g., "User action required"); or (d) the attributes of the respective access request do not satisfy at least one of the second criteria (e.g., "Not applied"). A grant control specifies conditions under which access to a resource is to be denied, even if attributes of a request to access the resource satisfy the criteria indicated by the access control policies. Examples of a condition that may be specified by a grant control include but are not limited to failure of a user who initiates the request to use multi-factor authentication, failure of the user to accept terms of use of the resource, and a device of the user being a non-compliant device (i.e., not satisfying compliance rules associated with the device). The rules associated with a device may require the device to have malware protection software installed thereon and/or have no malware stored or loaded on the device. The rules may prohibit the user of the device from accessing designated websites and/or designated storage locations. The rules may prohibit the device of the user from being a "jailbroken" device. A jailbroken device is a device for which manufacturer-imposed and/or seller-imposed software restrictions have been overridden (e.g., by use of kernel patches). For instance, jailbreaking a device may enable root access to tan operating system of the device in circumvention of the manufacturer-imposed and/or seller-imposed software restrictions. A grant control may be interactive or non-interactive. An example of a non-interactive grant control is a grant control that checks for a Hybrid Azure AD join or a compliant device.

When combining the results of enforcement of multiple access control policies to provide an aggregated result, a satisfaction indicator indicating "Failure" has a first priority, a satisfaction indicator indicating "User action required" has a second priority, a satisfaction indicator indicating "Success" has a third priority, and a satisfaction indicator indicating "Not applied" has a fourth priority. The first priority is greater than the second priority. The second priority is greater than the third priority. The third priority is greater than the fourth priority. Accordingly, if any one or more of the access control policies has a satisfaction indicator indicating "Failure," an aggregated indicator of "Failure" with regard to (e.g., to describe) the aggregated result is generated. If none of the access control policies has a satisfaction indicator indicating "Failure" and any one or more of the access control policies has a satisfaction indicator indicating "User action required," an aggregated indicator of "User action required" with regard to the aggregated result is generated. If none of the access control policies has a satisfaction indicator indicating "Failure," none of the access control policies has a satisfaction indicator indicating "User action required," and any one or more of the access control policies has a satisfaction indicator indicating "Success," an aggregated indicator of "Success" with regard to the aggregated result is generated. If all of the access control policies have satisfaction indicators indicating "Not applied," an aggregated indicator of "Not applied" with regard to the aggregated result is generated. The aggregated indicator may be caused to be displayed via the user interface.

In accordance with this embodiment, the information logic 1308 may cause the policy satisfaction indicator for each access request in at least the subset of the access requests 1314 to be displayed via the user interface. For instance, the information logic 1308 may generate the requested information 1340 to include the policy satisfaction indicator for each access requests in at least the subset of the access requests 1314. By providing the requested information 1340 to an admin system, the information logic 1308 may cause the admin system to display the policy satisfaction indicator for each access request in at least the subset of the access requests 1314 via a user interface of the admin system.

In an aspect of this embodiment, the method of flowchart 1200 further includes providing a recommendation to a user who initiated a designated access request, recommending performance of a specified future action by the user, based on the policy satisfaction indicator for the designated access request indicating that satisfaction of at least one grant control is dependent on the performance of the specified future action by the user. For example, the information logic 1308 may provide a recommendation 1316 to the user. In accordance with this example, the information logic 1308 may determine which user initiated the designated access request based on the metadata 1318. For instance, the metadata 1318 may indicate the user who initiated the designated access request.

It will be recognized that the security server 1300 may not include one or more of the comparison logic 1302, the enforcement logic 1304, the state logic 1306, the information logic 1308, the store 1310, and/or the metadata generating security logic 1312. Furthermore, the security server 1300 may include components in addition to or in lieu of the comparison logic 1302, the enforcement logic 1304, the state logic 1306, the information logic 1308, the store 1310, and/or the metadata generating security logic 1312.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of metadata generating security logic 112, comparison logic 1302, enforcement logic 1304, state logic 1306, information logic 1308, metadata generating security logic 1312, flowchart 1000, flowchart 1100, and/or flowchart 1200 may be implemented in hardware, software, firmware, or any combination thereof.

For example, any one or more of metadata generating security logic 112, comparison logic 1302, enforcement logic 1304, state logic 1306, information logic 1308, metadata generating security logic 1312, flowchart 1000, flowchart 1100, and/or flowchart 1200 may be implemented, at least in part, as computer program code configured to be executed in one or more processors.

In another example, any one or more of metadata generating security logic 112, comparison logic 1302, enforcement logic 1304, state logic 1306, information logic 1308, metadata generating security logic 1312, flowchart 1000, flowchart 1100, and/or flowchart 1200 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Further Discussion of Some Example Embodiments

A first example system comprises a memory and one or more processors coupled to the memory. The one or more processors are configured to evaluate a result of enforcement of access control policies with regard to sign-in processes that are configured to sign-in users to an enterprise instead of enforcing the access control policies with regard to the sign-in processes by performing operations. The operations comprise monitor access requests that are received during the sign-in processes, each access request requesting access to a resource in the enterprise. The operations further comprise compare attributes of each access request against at least a subset of the access control policies that specifies criteria that are to be satisfied as a prerequisite to granting access to the resource to which access is requested by the respective access request. The operations further comprise generate metadata associated with the sign-in processes, which indicate whether the attributes of each access request in at least a subset of the access requests satisfy the criteria that are to be satisfied as a prerequisite to granting access to the resource to which access is requested by the respective access request, instead of enforcing the access control policies with regard to the sign-in processes.

In a first aspect of the first example system, the one or more processors are configured to evaluate the result by performing the operations comprising select a designated state from a plurality of states that are available to be applied to a specified access control policy in response to instructions that are received via a user interface. The plurality of states include a first state in which the access requests are not to be compared against the specified access control policy and the specified access control policy is not to be enforced with regard to the sign-in processes, a second state in which at least a subset of the access requests is to be compared against the specified access control policy and the specified access control policy is to be enforced with regard to the sign-in processes, and a third state in which at least a subset of the access requests is to be compared against the specified access control policy and metadata associated with the sign-in processes are to be generated instead of enforcing the specified access control policy with regard to the sign-in processes. In accordance with the first aspect, the one or more processors are configured to evaluate the result by performing the operations comprising generate the metadata instead of enforcing the specified access control policy with regard to the sign-in processes based at least in part on the third state being selected as the designated state from the plurality of states to be applied to the specified access control policy.

In a second aspect of the first example system, the one or more processors are configured to evaluate the result by performing the operations comprising generate the metadata to be platform-agnostic such that the metadata is extensible to arbitrary platforms through an API. The second aspect of the first example system may be implemented in combination with the first aspect of the first example system, though the example embodiments are not limited in this respect.

In a third aspect of the first example system, the one or more processors are configured to evaluate the result by performing the operations comprising compare first attributes of one or more first access requests against a first access control policy that does not affect a result of enforcement of a second access control policy and that specifies one or more first criteria that are to be satisfied as a prerequisite to granting access to one or more first resources. In accordance with the third aspect, the one or more processors are configured to evaluate the result by performing the operations comprising compare second attributes of one or more second access requests against the second access control policy that does not affect a result of enforcement of the first access control policy and that specifies one or more second criteria that are to be satisfied as a prerequisite to granting access to one or more second resources. In further accordance with the third aspect, the one or more processors are configured to evaluate the result by performing the operations comprising generate the metadata by aggregating first metadata, which indicate whether the first attributes of the one or more first access requests satisfy the one or more first criteria, and second metadata, which indicate whether the second attributes of the one or more second access requests satisfy the one or more second criteria. The third aspect of the first example system may be implemented in combination with the first and/or second aspect of the first example system, though the example embodiments are not limited in this respect.

In a fourth aspect of the first example system, the one or more processors are configured to evaluate the result by performing the operations comprising compare first attributes of one or more first access requests against a first access control policy that specifies one or more first criteria that are to be satisfied as a prerequisite to granting access to one or more first resources. In accordance with the fourth aspect, the one or more processors are configured to evaluate the result by performing the operations comprising compare second attributes of one or more second access requests against a second access control policy that specifies one or more second criteria that are to be satisfied as a prerequisite to granting access to one or more second resources. In further accordance with the fourth aspect, the one or more processors are configured to evaluate the result by performing the operations comprising generate the metadata, including first metadata, which indicate whether the first attributes of the one or more first access requests satisfy the one or more first criteria, and second metadata, which indicate whether the second attributes of the one or more second access requests satisfy the one or more second criteria. In further accordance with the fourth aspect, the one or more processors are configured to evaluate the result by performing the operations comprising cause a comparison of a first representation of a first result of enforcement of the first access control policy and a second representation of a second result of enforcement of the second access control policy to be displayed via a user interface. The first representation of the first result of enforcement of the first access control policy indicates an extent to which the first attributes of the one or more first access requests satisfy at least one of the one or more first criteria based at least in part on the first metadata. The second representation of the second result of enforcement of the second access control policy indicates an extent to which the second attributes of the one or more second access requests satisfy at least one of the one or more second criteria based at least in part on the second metadata. The fourth aspect of the first example system may be implemented in combination with the first, second, and/or third aspect of the first example system, though the example embodiments are not limited in this respect.

In a fifth aspect of the first example system, the one or more processors are configured to evaluate the result by performing the operations comprising determine which users from a plurality of users who initiate the access requests use a legacy authentication technique to request access to at least one resource in the enterprise based at least in part on the metadata. In accordance with the fifth aspect, the one or more processors are configured to evaluate the result by performing the operations comprising provide an indicator that specifies at least one of (a) a number of the users who use the legacy authentication technique or (b) an identity of each of the users who use the legacy authentication technique. The fifth aspect of the first example system may be implemented in combination with the first, second, third, and/or fourth aspect of the first example system, though the example embodiments are not limited in this respect.

In a sixth aspect of the first example system, the one or more processors are configured to evaluate the result by performing the operations comprising detect that a first access control policy is created and set to an enforcement state in which the first access control policy is to be enforced. In accordance with the sixth aspect, the one or more processors are configured to evaluate the result by performing the operations comprising provide a warning that recommends evaluating a result of enforcement of the first access control policy with regard to one or more sign-in processes instead of enforcing the first access control policy with regard to the one or more sign-in processes. In further accordance with the sixth aspect, the one or more processors are configured to evaluate the result by performing the operations comprising detect that a state of the first access control policy is changed from the enforcement state to an evaluation state in which the result of enforcement of the first access control policy with regard to the one or more sign-in processes is to be evaluated instead of being enforced with regard to the one or more sign-in processes. In further accordance with the sixth aspect, the one or more processors are configured to evaluate the result by performing the operations comprising evaluate the result of enforcement of the access control policies, including the first access control policy, with regard to the sign-in processes instead of enforcing the access control policies with regard to the sign-in processes. The sixth aspect of the first example system may be implemented in combination with the first, second, third, fourth, and/or fifth aspect of the first example system, though the example embodiments are not limited in this respect.

In a seventh aspect of the first example system, the one or more processors are configured to evaluate the result by performing the operations comprising determine which applications from a plurality of applications are accessed by a specified access control policy based at least in part on the metadata. In accordance with the seventh aspect, the one or more processors are configured to evaluate the result by performing the operations comprising provide an indicator that specifies at least one of (a) a number of the applications that are accessed by the specified access control policy or (b) an identity of each of the applications that are accessed by the specified access control policy. The seventh aspect of the first example system may be implemented in combination with the first, second, third, fourth, fifth, and/or sixth aspect of the first example system, though the example embodiments are not limited in this respect.

A second example system comprises a memory and one or more processors coupled to the memory. The one or more processors are configured to enforce a first access control policy with regard to sign-in processes that are configured to sign-in users to an enterprise and evaluate a result of enforcement of a second access control policy with regard to the sign-in processes instead of enforcing the second access control policy with regard to the sign-in processes by performing operations. The operations comprise monitor access requests that are received during the sign-in processes. Each access request requests access to a resource in the enterprise. The operations further comprise compare attributes of each access request against the first access control policy that specifies first criteria that are to be satisfied as a prerequisite to granting access to the resource to which access is requested by the respective access request. The operations further comprise compare the attributes of each access request against the second access control policy that specifies second criteria that are to be satisfied as a prerequisite to granting access to the resource to which access is requested by the respective access request. The operations further comprise enforce the first access control policy with regard to the sign-in processes. The operations further comprise generate metadata associated with the sign-in processes, which indicate whether the attributes of each access request in at least a subset of the access requests satisfy the second criteria, instead of enforcing the second access control policy with regard to the sign-in processes.

In a first aspect of the second example system, the one or more processors are configured to enforce the first access control policy with regard to the sign-in processes and evaluate the result of enforcement of the second access control policy with regard to the sign-in processes instead of enforcing the second access control policy with regard to the sign-in processes by performing the operations comprising generate the metadata, which further indicates whether the attributes of each access request in at least a subset of the access requests satisfy the first criteria. In accordance with the first aspect, a first portion of the metadata indicates an actual result that occurs as a result of the first access policy being enforced with regard to the sign-in processes. In accordance with the first aspect, a second portion of the metadata indicates the result of enforcement of the second access control policy that would have occurred with regard to the sign-in processes had the second access control policy been enforced with regard to the sign-in processes.

In a second aspect of the second example system, a plurality of states are available to be applied to each of a plurality of access control policies that include the first access control policy and the second access control policy. The plurality of states includes a first state in which the access requests are not to be compared against the respective access control policy and the respective access control policy is not to be enforced with regard to the sign-in processes, a second state in which at least a subset of the access requests is to be compared against the respective access control policy and the respective access control policy is to be enforced with regard to the sign-in processes, and a third state in which at least a subset of the access requests is to be compared against the respective access control policy and metadata associated with the sign-in processes are to be generated instead of enforcing the respective access control policy with regard to the sign-in processes. In accordance with the second aspect, the operations comprise select the second state from the plurality of states to be applied to the first access control policy in response to first instructions that are received via a user interface. In accordance with the second aspect, the operations comprise select the third state from the plurality of states to be applied to the second access control policy in response to second instructions that are received via the user interface. In accordance with the second aspect, the operations comprise enforce the first access control policy with regard to the sign-in processes based at least in part on the second state being selected from the plurality of states to be applied to the first access control policy. In accordance with the second aspect, the operations comprise generate the metadata instead of enforcing the second access control policy with regard to the sign-in processes based at least in part on the third state being selected from the plurality of states to be applied to the second access control policy. The second aspect of the second example system may be implemented in combination with the first aspect of the second example system, though the example embodiments are not limited in this respect.

In a third aspect of the second example system, the one or more processors are configured to cause a comparison of a first representation of the actual result that occurs as a result of the first access policy being enforced with regard to the sign-in processes and a second representation of the result of enforcement of the second access control policy that would have occurred with regard to the sign-in processes had the second access control policy been enforced with regard to the sign-in processes to be displayed via a user interface. The first representation indicates an extent to which the attributes of each access request satisfy at least one of the first criteria based at least in part on the first portion of the metadata. The second representation indicates an extent to which the attributes of each access request satisfy at least one of the second criteria based at least in part on the second portion of the metadata. The third aspect of the second example system may be implemented in combination with the first and/or second aspect of the second example system, though the example embodiments are not limited in this respect.

In a fourth aspect of the second example system, the one or more processors are further configured to enable selection of any one or more of a plurality of access control policies via a first user interface to define a control policy selection regardless whether each access control policy in the control policy selection is enforced, the plurality of access control policies including the first access control policy and the second access control policy. In accordance with the fourth aspect, the one or more processors are further configured to cause a representation of a result of enforcement of the control policy selection to be displayed via a second user interface based at least in part on the control policy selection being defined by selection via the first user interface. The fourth aspect of the second example system may be implemented in combination with the first, second, and/or third aspect of the second example system, though the example embodiments are not limited in this respect.

In a fifth aspect of the second example system, the one or more processors are configured to cause a policy satisfaction indicator for each access request in at least the subset of the access requests to be displayed via a user interface. Each policy satisfaction indicator indicates one of the following indications that are available for the respective access request: a) that the attributes of the respective access request satisfy the second criteria and that grant controls, which are to be satisfied as a prerequisite to granting access to the resource and which are not specified by the second access control policy, are satisfied; b) that the attributes of the respective access request satisfy the second criteria and that at least one of the grant controls is not satisfied; c) that the attributes of the respective access request satisfy the second criteria and that satisfaction of at least one of the grant controls is dependent on performance of a future action by a user who initiated the respective access request; or b) that the attributes of the respective access request do not satisfy at least one of the second criteria. The fifth aspect of the second example system may be implemented in combination with the first, second, third, and/or fourth aspect of the second example system, though the example embodiments are not limited in this respect.

In an implementation of the fifth aspect of the second example system, the one or more processors are configured to provide a recommendation to a user who initiated a designated access request, recommending performance of a specified future action by the user, based at least in part on the policy satisfaction indicator for the designated access request indicating that satisfaction of at least one grant control is dependent on the performance of the specified future action by the user.

In a first example method, a result of enforcement of access control policies with regard to sign-in processes that are configured to sign-in users to an enterprise is evaluated instead of enforcing the access control policies with regard to the sign-in processes. The evaluating comprises monitoring access requests that are received during the sign-in processes, each access request requesting access to a resource in the enterprise. The evaluating further comprises comparing attributes of each access request against at least a subset of the access control policies that specifies criteria that are to be satisfied as a prerequisite to granting access to the resource to which access is requested by the respective access request. The evaluating further comprises generating metadata associated with the sign-in processes, which indicate whether the attributes of each access request in at least a subset of the access requests satisfy the criteria that are to be satisfied as a prerequisite to granting access to the resource to which access is requested by the respective access request, instead of enforcing the access control policies with regard to the sign-in processes.

In a first aspect of the first example method, the evaluating further comprises selecting a designated state from a plurality of states that are available to be applied to a specified access control policy in response to instructions that are received via a user interface. The plurality of states includes a first state in which the access requests are not to be compared against the specified access control policy and the specified access control policy is not to be enforced with regard to the sign-in processes, a second state in which at least a subset of the access requests is to be compared against the specified access control policy and the specified access control policy is to be enforced with regard to the sign-in processes, and a third state in which at least a subset of the access requests is to be compared against the specified access control policy and metadata associated with the sign-in processes are to be generated instead of enforcing the specified access control policy with regard to the sign-in processes. In accordance with the first aspect, generating the metadata comprises generating the metadata instead of enforcing the specified access control policy with regard to the sign-in processes based at least in part on the third state being selected as the designated state from the plurality of states to be applied to the specified access control policy.

In a second aspect of the first example method, generating the metadata comprises generating the metadata to be platform-agnostic such that the metadata is extensible to arbitrary platforms through an API. The second aspect of the first example method may be implemented in combination with the first aspect of the first example method, though the example embodiments are not limited in this respect.

In a third aspect of the first example method, comparing the attributes of each access request against at least a subset of the access control policies comprises comparing first attributes of one or more first access requests against a first access control policy that does not affect a result of enforcement of a second access control policy and that specifies one or more first criteria that are to be satisfied as a prerequisite to granting access to one or more first resources. In accordance with the third aspect, comparing the attributes of each access request against at least a subset of the access control policies comprises comparing second attributes of one or more second access requests against the second access control policy that does not affect a result of enforcement of the first access control policy and that specifies one or more second criteria that are to be satisfied as a prerequisite to granting access to one or more second resources. In further accordance with the third aspect, generating the metadata comprises generating the metadata by aggregating first metadata, which indicate whether the first attributes of the one or more first access requests satisfy the one or more first criteria, and second metadata, which indicate whether the second attributes of the one or more second access requests satisfy the one or more second criteria. The third aspect of the first example method may be implemented in combination with the first and/or second aspect of the first example method, though the example embodiments are not limited in this respect.

In a fourth aspect of the first example method, comparing the attributes of each access request against at least a subset of the access control policies comprises comparing first attributes of one or more first access requests against a first access control policy that specifies one or more first criteria that are to be satisfied as a prerequisite to granting access to one or more first resources. In accordance with the fourth aspect, comparing the attributes of each access request against at least a subset of the access control policies comprises comparing second attributes of one or more second access requests against a second access control policy that specifies one or more second criteria that are to be satisfied as a prerequisite to granting access to one or more second resources. In further accordance with the fourth aspect, generating the metadata comprises generating the metadata, including first metadata, which indicate whether the first attributes of the one or more first access requests satisfy the one or more first criteria, and second metadata, which indicate whether the second attributes of the one or more second access requests satisfy the one or more second criteria. In further accordance with the fourth aspect, the evaluating further comprises causing a comparison of a first representation of a first result of enforcement of the first access control policy and a second representation of a second result of enforcement of the second access control policy to be displayed via a user interface. The first representation of the first result of enforcement of the first access control policy indicates an extent to which the first attributes of the one or more first access requests satisfy at least one of the one or more first criteria based at least in part on the first metadata. The second representation of the second result of enforcement of the second access control policy indicates an extent to which the second attributes of the one or more second access requests satisfy at least one of the one or more second criteria based at least in part on the second metadata. The fourth aspect of the first example method may be implemented in combination with the first, second, and/or third aspect of the first example method, though the example embodiments are not limited in this respect.

In a fifth aspect of the first example method, the evaluating comprises determining which users from a plurality of users who initiate the access requests use a legacy authentication technique to request access to at least one resource in the enterprise based at least in part on the metadata. In accordance with the fifth aspect, the evaluating comprises providing an indicator that specifies at least one of (a) a number of the users who use the legacy authentication technique or (b) an identity of each of the users who use the legacy authentication technique. The fifth aspect of the first example method may be implemented in combination with the first, second, third, and/or fourth aspect of the first example method, though the example embodiments are not limited in this respect.

In a sixth aspect of the first example method, the evaluating comprises detecting that a first access control policy is created and set to an enforcement state in which the first access control policy is to be enforced. In accordance with the sixth aspect, the evaluating comprises providing a warning that recommends evaluating a result of enforcement of the first access control policy with regard to one or more sign-in processes instead of enforcing the first access control policy with regard to the one or more sign-in processes. In further accordance with the sixth aspect, the evaluating comprises detecting that a state of the first access control policy is changed from the enforcement state to an evaluation state in which the result of enforcement of the first access control policy with regard to the one or more sign-in processes is to be evaluated instead of being enforced with regard to the one or more sign-in processes. In further accordance with the sixth aspect, the evaluating comprises evaluating the result of enforcement of the access control policies, including the first access control policy, with regard to the sign-in processes instead of enforcing the access control policies with regard to the sign-in processes. The sixth aspect of the first example method may be implemented in combination with the first, second, third, fourth, and/or fifth aspect of the first example method, though the example embodiments are not limited in this respect.

In a seventh aspect of the first example method, the evaluating comprises determining which applications from a plurality of applications are accessed by a specified access control policy based at least in part on the metadata. In accordance with the seventh aspect, the evaluating comprises providing an indicator that specifies at least one of (a)

a number of the applications that are accessed by the specified access control policy or (b) an identity of each of the applications that are accessed by the specified access control policy. The seventh aspect of the first example method may be implemented in combination with the first, second, third, fourth, fifth, and/or sixth aspect of the first example method, though the example embodiments are not limited in this respect.

In a second example method, a first access control policy with regard to sign-in processes that are configured to sign-in users to an enterprise is evaluated and a result of enforcement of a second access control policy with regard to the sign-in processes is evaluated instead of enforcing the second access control policy with regard to the sign-in processes by performing operations. The operations comprise monitoring access requests that are received during the sign-in processes, each access request requesting access to a resource in the enterprise. The operations further comprise comparing attributes of each access request against the first access control policy that specifies first criteria that are to be satisfied as a prerequisite to granting access to the resource to which access is requested by the respective access request. The operations further comprise comparing the attributes of each access request against the second access control policy that specifies second criteria that are to be satisfied as a prerequisite to granting access to the resource to which access is requested by the respective access request. The operations further comprise enforcing the first access control policy with regard to the sign-in processes. The operations further comprise generating metadata associated with the sign-in processes, which indicate whether the attributes of each access request in at least a subset of the access requests satisfy the second criteria, instead of enforcing the second access control policy with regard to the sign-in processes.

In a first aspect of the second example method, the generating the metadata comprises generate the metadata, which further indicates whether the attributes of each access request in at least a subset of the access requests satisfy the first criteria. In accordance with the first aspect, a first portion of the metadata indicates an actual result that occurs as a result of the first access policy being enforced with regard to the sign-in processes. In further accordance with the first aspect, a second portion of the metadata indicates the result of enforcement of the second access control policy that would have occurred with regard to the sign-in processes had the second access control policy been enforced with regard to the sign-in processes.

In a second aspect of the second example method, a plurality of states are available to be applied to each of a plurality of access control policies that include the first access control policy and the second access control policy. The plurality of states includes a first state in which the access requests are not to be compared against the respective access control policy and the respective access control policy is not to be enforced with regard to the sign-in processes, a second state in which at least a subset of the access requests is to be compared against the respective access control policy and the respective access control policy is to be enforced with regard to the sign-in processes, and a third state in which at least a subset of the access requests is to be compared against the respective access control policy and metadata associated with the sign-in processes are to be generated instead of enforcing the respective access control policy with regard to the sign-in processes. In accordance with the second aspect, the operations further comprise selecting the second state from the plurality of states to be applied to the first access control policy in response to first instructions that are received via a user interface. In further accordance with the second aspect, the operations further comprise selecting the third state from the plurality of states to be applied to the second access control policy in response to second instructions that are received via the user interface. In further accordance with the second aspect, enforcing the first access control policy comprises enforcing the first access control policy with regard to the sign-in processes based at least in part on the second state being selected from the plurality of states to be applied to the first access control policy. In further accordance with the second aspect, generating the metadata comprises generating the metadata instead of enforcing the second access control policy with regard to the sign-in processes based at least in part on the third state being selected from the plurality of states to be applied to the second access control policy. The second aspect of the second example method may be implemented in combination with the first aspect of the second example method, though the example embodiments are not limited in this respect.

In a third aspect of the second example method, the operations further comprise causing a comparison of a first representation of the actual result that occurs as a result of the first access policy being enforced with regard to the sign-in processes and a second representation of the result of enforcement of the second access control policy that would have occurred with regard to the sign-in processes had the second access control policy been enforced with regard to the sign-in processes to be displayed via a user interface. The first representation indicates an extent to which the attributes of each access request satisfy at least one of the first criteria based at least in part on the first portion of the metadata. The second representation indicates an extent to which the attributes of each access request satisfy at least one of the second criteria based at least in part on the second portion of the metadata. The third aspect of the second example method may be implemented in combination with the first and/or second aspect of the second example method, though the example embodiments are not limited in this respect.

In a fourth aspect of the second example method, the operations further comprise enabling selection of any one or more of a plurality of access control policies via a first user interface to define a control policy selection regardless whether each access control policy in the control policy selection is enforced. The plurality of access control policies includes the first access control policy and the second access control policy. In accordance with the fourth aspect, the operations further comprise causing a representation of a result of enforcement of the control policy selection to be displayed via a second user interface based at least in part on the control policy selection being defined by selection via the first user interface. The fourth aspect of the second example method may be implemented in combination with the first, second, and/or third aspect of the second example method, though the example embodiments are not limited in this respect.

In a fifth aspect of the second example method, the operations further comprise causing a policy satisfaction indicator for each access request in at least the subset of the access requests to be displayed via a user interface. Each policy satisfaction indicator indicates one of the following indications that are available for the respective access request: a) that the attributes of the respective access request satisfy the second criteria and that grant controls, which are to be satisfied as a prerequisite to granting access to the resource and which are not specified by the second access control policy, are satisfied; b) that the attributes of the respective access request satisfy the second criteria and that at least one of the grant controls is not satisfied; c) that the attributes of the respective access request satisfy the second criteria and that satisfaction of at least one of the grant controls is dependent on performance of a future action by a user who initiated the respective access request; or d) that the attributes of the respective access request do not satisfy at least one of the second criteria. The fifth aspect of the second example method may be implemented in combination with the first, second, third, and/or fourth aspect of the second example method, though the example embodiments are not limited in this respect.

In an implementation of the fifth aspect of the second example method, the operations further comprise providing a recommendation to a user who initiated a designated access request, recommending performance of a specified future action by the user, based at least in part on the policy satisfaction indicator for the designated access request indicating that satisfaction of at least one grant control is dependent on the performance of the specified future action by the user.

A first example computer program product comprises a computer-readable storage medium having instructions recorded thereon for enabling a processor-based system to perform operations. The operations comprise evaluate a result of enforcement of access control policies with regard to sign-in processes that are configured to sign-in users to an enterprise instead of enforcing the access control policies with regard to the sign-in processes by performing the following: monitor access requests that are received during the sign-in processes, each access request requesting access to a resource in the enterprise; compare attributes of each access request against at least a subset of the access control policies that specifies criteria that are to be satisfied as a prerequisite to granting access to the resource to which access is requested by the respective access request; and generate metadata associated with the sign-in processes, which indicate whether the attributes of each access request in at least a subset of the access requests satisfy the criteria that are to be satisfied as a prerequisite to granting access to the resource to which access is requested by the respective access request, instead of enforcing the access control policies with regard to the sign-in processes.

A second example computer program product comprises a computer-readable storage medium having instructions recorded thereon for enabling a processor-based system to perform operations. The operations comprise enforce a first access control policy with regard to sign-in processes that are configured to sign-in users to an enterprise and evaluate a result of enforcement of a second access control policy with regard to the sign-in processes instead of enforcing the second access control policy with regard to the sign-in processes by performing operations by performing the following: monitor access requests that are received during the sign-in processes, each access request requesting access to a resource in the enterprise; compare attributes of each access request against the first access control policy that specifies first criteria that are to be satisfied as a prerequisite to granting access to the resource to which access is requested by the respective access request; compare the attributes of each access request against the second access control policy that specifies second criteria that are to be satisfied as a prerequisite to granting access to the resource to which access is requested by the respective access request; enforce the first access control policy with regard to the sign-in processes; and generate metadata associated with the sign-in processes, which indicate whether the attributes of each access request in at least a subset of the access requests satisfy the second criteria, instead of enforcing the second access control policy with regard to the sign-in processes.

IV. Example Computer System

Figure 14:
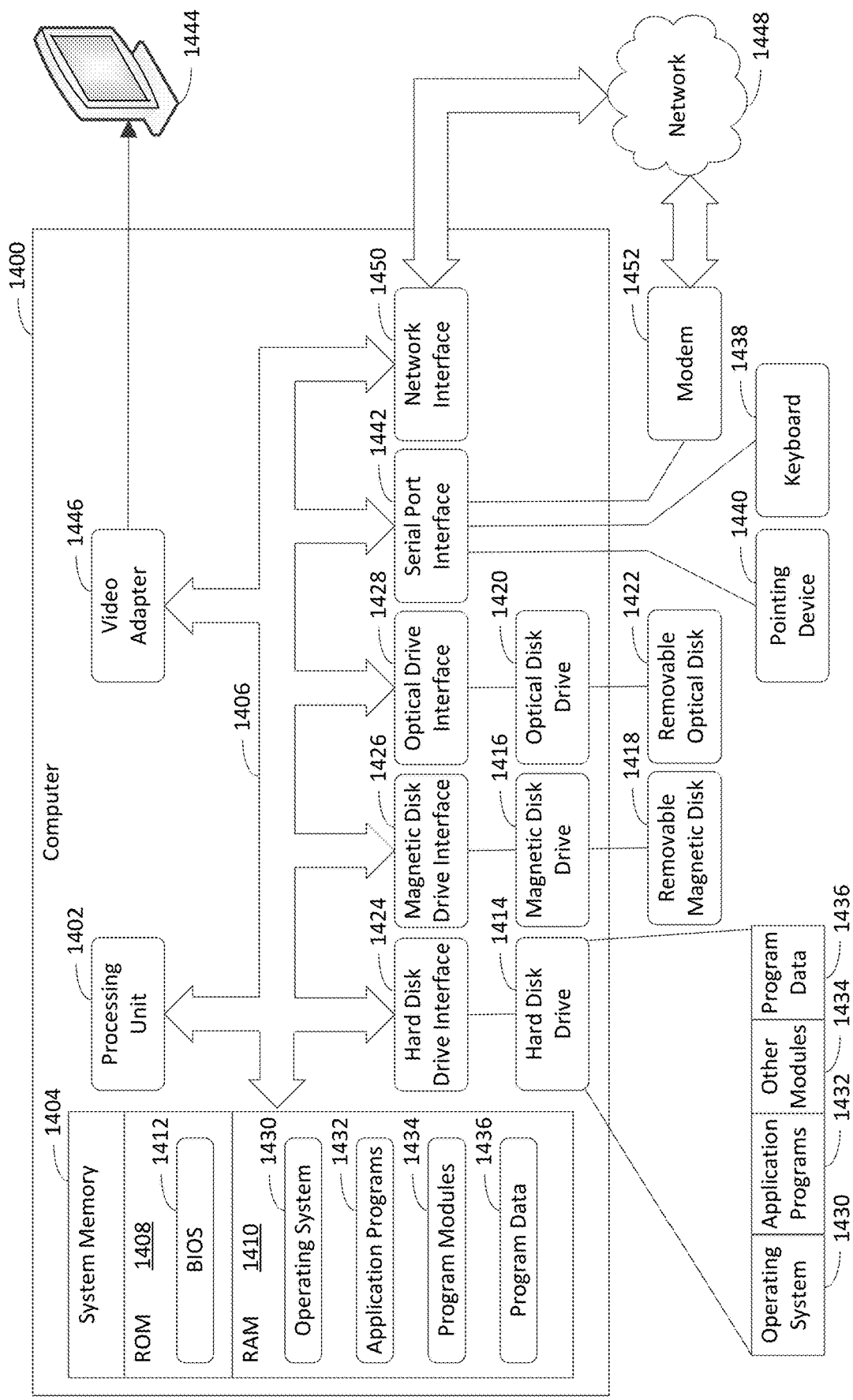
FIG. 14 depicts an example computer in which embodiments may be implemented.

FIG. 14 depicts an example computer 1400 in which embodiments may be implemented. Any one or more of the user devices 102A-102M, any one or more of the servers 106A-106N, the security server 108, and/or the admin system 110 shown in FIG. 1 and/or the security server 1300 shown in FIG. 13 may be implemented using computer 1400, including one or more features of computer 1400 and/or alternative features. Computer 1400 may be a general-purpose computing device in the form of a conventional personal computer, a mobile computer, or a workstation, for example, or computer 1400 may be a special purpose computing device. The description of computer 1400 provided herein is provided for purposes of illustration, and is not intended to be limiting. Embodiments may be implemented in further types of computer systems, as would be known to persons skilled in the relevant art(s).

As shown in FIG. 14, computer 1400 includes a processing unit 1402, a system memory 1404, and a bus 1406 that couples various system components including system memory 1404 to processing unit 1402. Bus 1406 represents one or more of any of several types of bus structures, including a memory bus or memory controller, a peripheral bus, an accelerated graphics port, and a processor or local bus using any of a variety of bus architectures. System memory 1404 includes read only memory (ROM) 1408 and random access memory (RAM) 1410. A basic input/output system 1412 (BIOS) is stored in ROM 1408.

Computer 1400 also has one or more of the following drives: a hard disk drive 1414 for reading from and writing to a hard disk, a magnetic disk drive 1416 for reading from or writing to a removable magnetic disk 1418, and an optical disk drive 1420 for reading from or writing to a removable optical disk 1422 such as a CD ROM, DVD ROM, or other optical media. Hard disk drive 1414, magnetic disk drive 1416, and optical disk drive 1420 are connected to bus 1406 by a hard disk drive interface 1424, a magnetic disk drive interface 1426, and an optical drive interface 1428, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1430, one or more application programs 1432, other program modules 1434, and program data 1436. Application programs 1432 or program modules 1434 may include, for example, computer program logic for implementing any one or more of metadata generating security logic 112, comparison logic 1302, enforcement logic 1304, state logic 1306, information logic 1308, metadata generating security logic 1312, flowchart 1000 (including any step of flowchart 1000), flowchart 1100 (including any step of flowchart 1100), and/or flowchart 1200 (including any step of flowchart 1200), as described herein.

A user may enter commands and information into the computer 1400 through input devices such as keyboard 1438 and pointing device 1440. Other input devices (not shown) may include a microphone, joystick, game pad, satellite dish, scanner, touch screen, camera, accelerometer, gyroscope, or the like. These and other input devices are often connected to the processing unit 1402 through a serial port interface 1442 that is coupled to bus 1406, but may be connected by other interfaces, such as a parallel port, game port, or a universal serial bus (USB).

A display device 1444 (e.g., a monitor) is also connected to bus 1406 via an interface, such as a video adapter 1446. In addition to display device 1444, computer 1400 may include other peripheral output devices (not shown) such as speakers and printers.

Computer 1400 is connected to a network 1448 (e.g., the Internet) through a network interface or adapter 1450, a modem 1452, or other means for establishing communications over the network. Modem 1452, which may be internal or external, is connected to bus 1406 via serial port interface 1442.

As used herein, the terms "computer program medium" and "computer-readable storage medium" are used to generally refer to media (e.g., non-transitory media) such as the hard disk associated with hard disk drive 1414, removable magnetic disk 1418, removable optical disk 1422, as well as other media such as flash memory cards, digital video disks, random access memories (RAMs), read only memories (ROM), and the like. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 1432 and other program modules 1434) may be stored on the hard disk, magnetic disk, optical disk, ROM, or RAM. Such computer programs may also be received via network interface 1450 or serial port interface 1442. Such computer programs, when executed or loaded by an application, enable computer 1400 to implement features of embodiments discussed herein. Accordingly, such computer programs represent controllers of the computer 1400.

Example embodiments are also directed to computer program products comprising software (e.g., computer-readable instructions) stored on any computer-useable medium. Such software, when executed in one or more data processing devices, causes data processing device(s) to operate as described herein.

Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A processor-based system comprising:
memory; and
a processing system coupled to the memory, the processing system configured to:
  detect that an identified access control policy is created and set to an enforcement state in which the identified access control policy is to be enforced;
  provide a warning that recommends simulating enforcement of the identified access control policy with regard to an identified actual sign-in process instead of enforcing the identified access control policy with regard to the identified actual sign-in process;
  detect that a state of the identified access control policy is changed from the enforcement state to a simulation state in which the enforcement of the identified access control policy with regard to the identified actual sign-in process is to be simulated;
  simulate enforcement of access control policies, including the identified access control policy, with regard to actual sign-in processes that are configured to sign-in users to a system instead of enforcing the access control policies with regard to the actual sign-in processes by performing operations, the operations comprising:
    monitor access requests that are received during the actual sign-in processes, the access requests requesting access to a resource in the system;
    compare attributes of the access requests against at least a subset of the access control policies that specifies criteria that are to be satisfied as a prerequisite to granting access to the resource to which access is requested by the access requests; and
    generate metadata associated with the actual sign-in processes, which indicate whether the attributes of the access requests in at least a subset of the access requests satisfy the criteria that are to be satisfied as a prerequisite to granting access to the resource to which access is requested by the access requests, instead of enforcing the access control policies with regard to the actual sign-in processes; and
  provide a recommendation, which recommends performance of an action, based at least in part on simulation of the enforcement of the access control policies with regard to the actual sign-in processes and based at least in part on the attributes of a specified access request not satisfying the criteria that are to be satisfied as the prerequisite to granting access to the resource to which access is requested by the specified access request.

2. The processor-based system of claim 1, wherein the processing system is configured to simulate the enforcement of the access control policies by performing the operations comprising:
  select a designated state from a plurality of states that are available to be applied to a specified access control policy in response to instructions that are received via a user interface, the plurality of states including a first state in which the access requests are not to be compared against the specified access control policy and the specified access control policy is not to be enforced with regard to the actual sign-in processes, a second state in which at least a subset of the access requests is to be compared against the specified access control policy and the specified access control policy is to be enforced with regard to the actual sign-in processes, and a third state in which at least a subset of the access requests is to be compared against the specified access control policy and metadata associated with the actual sign-in processes are to be generated instead of enforcing the specified access control policy with regard to the actual sign-in processes; and
  generate the metadata instead of enforcing the specified access control policy with regard to the actual sign-in processes based at least in part on the third state being selected as the designated state from the plurality of states to be applied to the specified access control policy.

3. The processor-based system of claim 1, wherein the processing system is configured to simulate the enforcement of the access control policies by performing the operations comprising:
  generate the metadata to be platform-agnostic, which enables the metadata to be extensible to arbitrary platforms through an API.

4. The processor-based system of claim 1, wherein the processing system is configured to simulate the enforcement of the access control policies by performing the operations comprising:
  compare a first attribute of a first access request against a first access control policy that does not affect a result of enforcement of a second access control policy and that specifies a first criterion that is to be satisfied as a prerequisite to granting access to a first resource;
  compare a second attribute of a second access request against the second access control policy that does not affect a result of enforcement of the first access control policy and that specifies a second criterion that is to be satisfied as a prerequisite to granting access to a second resource; and
  generate the metadata by aggregating first metadata, which indicate whether the first attribute of the first access request satisfies the first criterion, and second metadata, which indicate whether the second attribute of the second access request satisfies the second criterion.

5. The processor-based system of claim 1, wherein the processing system is configured to simulate the enforcement of the access control policies by performing the operations comprising:
  compare a first attribute of a first access request against a first access control policy that specifies a first criterion that is to be satisfied as a prerequisite to granting access to a first resource;
  compare a second attribute of a second access request against a second access control policy that specifies a second criterion that is to be satisfied as a prerequisite to granting access to a second resource;
  generate the metadata, including first metadata, which indicate whether the first attribute of the first access request satisfies the first criterion, and second metadata, which indicate whether the second attribute of the second access request satisfies the second criterion; and
  cause a comparison of a first representation of a first result of enforcement of the first access control policy and a second representation of a second result of enforcement of the second access control policy to be displayed via a user interface, the first representation of the first result of enforcement of the first access control policy indicating an extent to which the first attribute of the first access request satisfies the first criterion based at least in part on the first metadata, the second representation of the second result of enforcement of the second access control policy indicating an extent to which the second attribute of the second access request satisfies the second criterion based at least in part on the second metadata.

6. The processor-based system of claim 1, wherein the processing system is configured to simulate the enforcement of the access control policies by performing the operations comprising:
  determine which applications from a plurality of applications are accessed by a specified access control policy based at least in part on the metadata; and
  provide an indicator that specifies at least one of (a) a number of the applications that are accessed by the specified access control policy or (b) an identity of an application that is accessed by the specified access control policy.

7. The processor-based system of claim 1, wherein the processing system is configured to simulate the enforcement of the access control policies by performing the operations further comprising:
  determine which users from a plurality of users who initiate the access requests use a legacy authentication technique to request access to at least one resource in the system based at least in part on the metadata; and
  provide an indicator that specifies at least one of (a) a number of the users who use the legacy authentication technique or (b) identities of the users who use the legacy authentication technique.

8. A method comprising:
detecting that an identified access control policy is created and set to an enforcement state in which the identified access control policy is to be enforced;
providing a warning that recommends simulating enforcement of the identified access control policy with regard to an identified actual sign-in process instead of enforcing the identified access control policy with regard to the identified actual sign-in process;
detecting that a state of the identified access control policy is changed from the enforcement state to a simulation state in which the enforcement of the identified access control policy with regard to the identified actual sign-in process is to be simulated;
simulating enforcement of access control policies, including the identified access control policy, with regard to actual sign-in processes that are configured to sign-in users to a system instead of enforcing the access control policies with regard to the actual sign-in processes, the simulating comprising:

monitoring access requests that are received during the actual sign-in processes, the access requests requesting access to a resource in the system;

comparing attributes of the access requests against at least a subset of the access control policies that specifies criteria that are to be satisfied as a prerequisite to granting access to the resource to which access is requested by the access requests; and generating metadata associated with the actual sign-in processes, which indicate whether the attributes of the access requests in at least a subset of the access requests satisfy the criteria that are to be satisfied as a prerequisite to granting access to the resource to which access is requested by the access requests, instead of enforcing the access control policies with regard to the actual sign-in processes; and providing a recommendation, which recommends performance of an action, based at least in part on simulation of the enforcement of the access control policies with regard to the actual sign-in processes and based at least in part on the attributes of a specified access request not satisfying the criteria that are to be satisfied as the prerequisite to granting access to the resource to which access is requested by the specified access request.

9. The method of claim 8, wherein the simulating further comprises:

selecting a designated state from a plurality of states that are available to be applied to a specified access control policy in response to instructions that are received via a user interface, the plurality of states including a first state in which the access requests are not to be compared against the specified access control policy and the specified access control policy is not to be enforced with regard to the actual sign-in processes, a second state in which at least a subset of the access requests is to be compared against the specified access control policy and the specified access control policy is to be enforced with regard to the actual sign-in processes, and a third state in which at least a subset of the access requests is to be compared against the specified access control policy and metadata associated with the actual sign-in processes are to be generated instead of enforcing the specified access control policy with regard to the actual sign-in processes;

wherein generating the metadata comprises:

generating the metadata instead of enforcing the specified access control policy with regard to the actual sign-in processes based at least in part on the third state being selected as the designated state from the plurality of states to be applied to the specified access control policy.

10. The method of claim 8, wherein comparing the attributes of the access requests against at least a subset of the access control policies comprises:

comparing a first attribute of a first access request against a first access control policy that specifies a first criterion that is to be satisfied as a prerequisite to granting access to a first resource; and comparing a second attribute of a second access request against a second access control policy that specifies a second criterion that is to be satisfied as a prerequisite to granting access to a second resource;

wherein generating the metadata comprises:

generating the metadata, including first metadata, which indicate whether the first attribute of the first access request satisfies the first criterion, and second metadata, which indicate whether the second attribute of the second access request satisfies the second criterion; and wherein the simulating further comprises:

causing a comparison of a first representation of a first result of enforcement of the first access control policy and a second representation of a second result of enforcement of the second access control policy to be displayed via a user interface, the first representation of the first result of enforcement of the first access control policy indicating an extent to which the first attribute of the first access request satisfies the first criterion based at least in part on the first metadata, the second representation of the second result of enforcement of the second access control policy indicating an extent to which the second attribute of the second access request satisfies the second criterion based at least in part on the second metadata.

11. The method of claim 8, wherein the simulating comprises:

determining which applications from a plurality of applications are accessed by a specified access control policy based at least in part on the metadata; and providing an indicator that specifies at least one of (a) a number of the applications that are accessed by the specified access control policy or (b) an identity of an application that is accessed by the specified access control policy.

12. The method of claim 8, wherein comparing the attributes of the access requests against at least a subset of the access control policies comprises:

comparing a first attribute of a first access request against a first access control policy that does not affect a result of enforcement of a second access control policy and that specifies a first criterion that is to be satisfied as a prerequisite to granting access to a first resource; and comparing a second attribute of a second access request against the second access control policy that does not affect a result of enforcement of the first access control policy and that specifies a second criterion that is to be satisfied as a prerequisite to granting access to a second resource; and wherein generating the metadata comprises:

generating the metadata by aggregating first metadata, which indicate whether the first attribute of the first access request satisfies the first criterion, and second metadata, which indicate whether the second attribute of the second access request satisfies the second criterion.

13. The method of claim 8, wherein the simulating further comprises:

determining which users from a plurality of users who initiate the access requests use a legacy authentication technique to request access to at least one resource in the system based at least in part on the metadata; and providing an indicator that specifies at least one of (a) a number of the users who use the legacy authentication technique or (b) identities of the users who use the legacy authentication technique.

14. The method of claim 8, wherein simulating the enforcement of the access control policies comprises:

generating the metadata to be platform-agnostic such that the metadata is extensible to arbitrary platforms through an API.

15. A computer program product comprising a computer-readable storage medium having instructions recorded thereon for enabling a processor-based system to perform operations, the operations comprising:

detecting that an identified access control policy is created and set to an enforcement state in which the identified access control policy is to be enforced;

providing a warning that recommends simulating enforcement of the identified access control policy with regard to an identified actual sign-in process instead of enforcing the identified access control policy with regard to the identified actual sign-in process;

detecting that a state of the identified access control policy is changed from the enforcement state to a simulation state in which the enforcement of the identified access control policy with regard to the identified actual sign-in process is to be simulated;

simulating enforcement of access control policies, including the identified access control policy, with regard to actual sign-in processes that are configured to sign-in users to a system instead of enforcing the access control policies with regard to the actual sign-in processes, the simulating comprising:

monitoring access requests that are received during the actual sign-in processes, the access requests requesting access to a resource in the system;

comparing attributes of the access requests against at least a subset of the access control policies that specifies criteria that are to be satisfied as a prerequisite to granting access to the resource to which access is requested by the access requests; and generating metadata associated with the actual sign-in processes, which indicate whether the attributes of the access requests in at least a subset of the access requests satisfy the criteria that are to be satisfied as a prerequisite to granting access to the resource to which access is requested by the access requests, instead of enforcing the access control policies with regard to the actual sign-in processes; and providing a recommendation, which recommends performance of an action, based at least in part on simulation of the enforcement of the access control policies with regard to the actual sign-in processes and based at least in part on the attributes of a specified access request not satisfying the criteria that are to be satisfied as the prerequisite to granting access to the resource to which access is requested by the specified access request.

16. The computer program product of claim 15, wherein the operations comprise:

comparing a first attribute of a first access request against a first access control policy that does not affect a result of enforcement of a second access control policy and that specifies a first criterion that is to be satisfied as a prerequisite to granting access to a first resource;

comparing a second attribute of a second access request against the second access control policy that does not affect a result of enforcement of the first access control policy and that specifies a second criterion that is to be satisfied as a prerequisite to granting access to a second resource; and generating the metadata by aggregating first metadata, which indicate whether the first attribute of the first access request satisfies the first criterion, and second metadata, which indicate whether the second attribute of the second access request satisfies the second criterion.

17. The computer program product of claim 15, wherein the operations comprise:

comparing a first attribute of a first access request against a first access control policy that specifies a first criterion that is to be satisfied as a prerequisite to granting access to a first resource;

comparing a second attribute of a second access request against a second access control policy that specifies a second criterion that is to be satisfied as a prerequisite to granting access to a second resource;

generating the metadata, including first metadata, which indicate whether the first attribute of the first access request satisfies the first criterion, and second metadata, which indicate whether the second attribute of the second access request satisfies the second criterion; and causing a comparison of a first representation of a first result of enforcement of the first access control policy and a second representation of a second result of enforcement of the second access control policy to be displayed via a user interface, the first representation of the first result of enforcement of the first access control policy indicating an extent to which the first attribute of the first access request satisfies the first criterion based at least in part on the first metadata, the second representation of the second result of enforcement of the second access control policy indicating an extent to which the second attribute of the second access request satisfies the second criterion based at least in part on the second metadata.

18. The computer program product of claim 15, wherein the operations comprise:

determining which applications from a plurality of applications are accessed by a specified access control policy based at least in part on the metadata; and providing an indicator that specifies at least one of (a) a number of the applications that are accessed by the specified access control policy or (b) an identity of an application that is accessed by the specified access control policy.

19. The computer program product of claim 15, wherein the operations comprise:

determining which users from a plurality of users who initiate the access requests use a legacy authentication technique to request access to at least one resource in the system based at least in part on the metadata; and providing an indicator that specifies at least one of (a) a number of the users who use the legacy authentication technique or (b) identities of the users who use the legacy authentication technique.

20. The computer program product of claim 15, wherein the operations comprise:

generating the metadata to be platform-agnostic such that the metadata is extensible to arbitrary platforms through an API.

* * * * *